(12) United States Patent  (10) Patent No.: US 7,734,303 B2
Krishnamoorthi et al.  (45) Date of Patent: Jun. 8, 2010

(54) PILOT MODULATION ERROR RATIO FOR EVALUATION OF TRANSMITTER PERFORMANCE

(75) Inventors: Raghuraman Krishnamoorthi, San Diego, CA (US); Thomas Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 11/444,204

(22) Filed: May 30, 2006

(65) Prior Publication Data

US 2007/0243837 A1  Oct. 18, 2007

Related U.S. Application Data

(60) Provisional application No. 60/791,753, filed on Apr. 12, 2006.

(51) Int. Cl.
*H04Q 7/20* (2006.01)
(52) U.S. Cl. .................. 455/501; 455/500; 455/91; 455/103; 455/67.11; 455/104; 370/335; 370/337; 370/347; 370/341
(58) Field of Classification Search .......... 455/500, 455/501, 517, 91, 95, 115.1–115.4, 422.1, 455/403, 423–425, 426.1, 426.2, 450–453, 455/509, 511, 515, 67.11, 67.13, 103, 104, 455/114.2; 370/335, 337, 347, 341
See application file for complete search history.

(56) References Cited

U.S. PATENT DOCUMENTS 3,747,065 A 7/1973 Gibson
5,054,036 A 10/1991 Brownlie et al.
5,621,767 A 4/1997 Brandt et al.

(Continued)

FOREIGN PATENT DOCUMENTS

EP  1 052 821 A2  11/2000

(Continued)

OTHER PUBLICATIONS

Keller, T. et al: "Blind-detection Assisted Sub-band Adaptive Turbo-coded OFDM Schemes" Vehicular Technology Conference, 1999 IEEE 49th Houston, TX, USA May 16-20, 1999, Piscataway, NJ, USA, IEEE, US, vol. 1, May 16, 1999, pp. 489-493.

(Continued)

*Primary Examiner*—Keith T Ferguson
(74) *Attorney, Agent, or Firm*—Stanton Braden; Gerald P. Joyce, III

(57) ABSTRACT

Systems and methodologies are described that facilitate monitoring transmitter performance in a wireless communication environment. A metric or metrics associated with one or more pilot symbols can be generated and used to evaluate performance. To generate pilot metrics, a signal analyzer can be used to sample the output of a transmitter and the sampled signal can be propagated to a processor. The processor can generate frequency domain channel estimates for subcarriers. Average channel estimates for the subcarriers can be used with the known pilot symbols to determine noise or error for each subcarrier, which can be used to generate the noise variance for each of the pilot symbols. A pilot modulation error metric can be generated based upon the average channel estimates and noise variance.

34 Claims, 19 Drawing Sheets

U.S. PATENT DOCUMENTS

| | | | |
|---|---|---|---|
| 5,692,098 | A | 11/1997 | Kurdziel |
| 6,275,523 | B1 | 8/2001 | Chen et al. |
| 6,347,071 | B1 * | 2/2002 | Cupo et al. ................ 370/203 |
| 6,636,994 | B1 | 10/2003 | Waschura et al. |
| 6,717,934 | B1 | 4/2004 | Kaasila et al. |
| 7,009,932 | B2 | 3/2006 | Matheus et al. |
| 7,161,896 | B1 | 1/2007 | Hart et al. |
| 7,231,183 | B2 | 6/2007 | Pauli |
| 7,272,109 | B2 | 9/2007 | Webster et al. |
| 7,298,691 | B1 | 11/2007 | Yong, III et al. |
| 7,315,582 | B2 | 1/2008 | Chouly et al. |
| 7,321,559 | B2 | 1/2008 | Etter et al. |
| 7,328,389 | B2 | 2/2008 | Murakami et al. |
| 7,392,368 | B2 | 6/2008 | Khan et al. |
| 7,583,584 | B2 | 9/2009 | Wang et al. |
| 7,630,465 | B2 | 12/2009 | Nieto |
| 2002/0110138 | A1 * | 8/2002 | Schramm ................... 370/430 |
| 2004/0073773 | A1 | 4/2004 | Demjanenko |
| 2005/0094746 | A1 | 5/2005 | Akita |
| 2007/0286317 | A1 | 12/2007 | Stentiford et al. |

FOREIGN PATENT DOCUMENTS

| | | |
|---|---|---|
| EP | 1052821 | 11/2000 |
| EP | 1158717 | 11/2001 |
| EP | 1 176 750 A1 | 1/2002 |
| EP | 1 434 381 A1 | 6/2004 |
| EP | 1434381 | 6/2004 |

OTHER PUBLICATIONS

International Search Report—PCT/US2007/066325, Internationals Earch Authority—European Patent Office—Sep. 6, 2007.

Written Opinion—PCT/US2007/066325, International Search Authority—European Patent Office—Sep. 6, 2007.

International Preliminary Report on Patentability—PCT/US2007/066325, International Search Authority—European Patent Office—Jul. 10, 2008.

J.H. Stott, M.A., "The Effects of Frequency Errors in OFDM," BBC Research and Development Report, 1995/15.

M. Ramaswamy, T. Sun, F. Ling, R. Krishnamoorthi and D. van Veen, "Test Receiver for FLO Transmitter," Qualcomm Internal Presentation, Jun. 2005.

T. Sun, "Confidence Level of Estimated Noise," Qualcomm Internal Memo, Jun. 2005.

* cited by examiner

PILOT MODULATION ERROR RATIO FOR EVALUATION OF TRANSMITTER PERFORMANCE

CROSS-REFERENCE

This application claims the benefit of U.S. Provisional Application Ser. No. 60/791,753 entitled "PILOT MODULATION ERROR RATE," filed on Apr. 12, 2006. The entirety of the above-referenced application is incorporated herein by reference. This application is also related to U.S. application Ser. No. 11/361,085 entitled "EVALUATION OF TRANSMITTER PERFORMANCE," filed on Feb. 22, 2006 and U.S. application Ser. No. 11/361,088 entitled "MODULATION TYPE DETERMINATION FOR EVALUATION OF TRANSMITTER PERFORMANCE," filed on Feb. 22, 2006.

BACKGROUND

I. Field

The following description relates generally to wireless communications, and, amongst other things, to evaluation of transmitter performance.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service and expanded areas of coverage.

A typical wireless communication network (e.g., employing frequency, time, and code division techniques) includes one or more base stations that provide a coverage area and one or more mobile (e.g., wireless) user devices that can transmit and receive data within the coverage area. A typical base station can simultaneously transmit multiple data streams for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

Forward Link Only (FLO) technology has been developed by an industry group of wireless communication service providers to utilize the latest advances in system design to achieve the highest-quality performance. FLO technology is intended for a mobile multimedia environment and is suited for use with mobile user devices. FLO technology is designed to achieve high quality reception, both for real-time content streaming and other data services. FLO technology can provide robust mobile performance and high capacity without compromising power consumption. In addition, the technology reduces the network cost of delivering multimedia content by decreasing the number of base station transmitters that are needed to be deployed. Furthermore, FLO technology based multimedia multicasting is complimentary to the wireless operators' cellular network data and voice services, delivering content to the same mobile devices.

Base station transmitter performance is vital to the overall performance of a wireless system. Errors or noise in a signal generated by a transmitter can lead to loss or corruption of data between transmitter and receiver. In particular, in a wireless system utilizing FLO technology, which can utilize fewer transmitters, the performance of each transmitter is critical.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with monitoring transmitter performance in a wireless communication environment. A metric or metrics associated with one or more pilot symbols can be generated and used to evaluate performance. To generate pilot metrics, a signal analyzer can be used to sample the output of a transmitter and the sampled signal can be propagated to a processor. The processor can generate frequency domain channel estimates for subcarriers. Average channel estimates for the subcarriers can be used with the known pilot symbols to determine noise or error for each subcarrier, which can be used to generate the noise variance for each of the pilot symbols. A pilot modulation error metric can be generated based upon the average channel estimates and noise variance.

In an aspect, a method includes generating an average frequency domain channel estimate for each subcarrier over a unit of data of a transmitter signal, determining pilot symbol noise for each of the subcarriers associated with a pilot symbol based upon the average frequency domain channel estimate for each of the subcarriers. The method then includes determining average noise variance for the pilot symbol based at least in part upon the pilot symbol noise for each of the subcarriers associated with the pilot symbol. The method includes generating a pilot modulation error ratio indicative of transmitter performance based at least in part upon the average noise variance for the pilot symbol and the average frequency domain channel estimate for each of the subcarriers.

In another aspect, an apparatus includes a processor that generates a pilot modulation error ratio for a pilot symbol and a memory, coupled to the processor that stores information related to the pilot symbol. The processor generates an average frequency domain channel estimates for each of a plurality of subcarriers of a superframe of an RF signal and determines the noise variance for each pilot symbol within the superframe based at least in part upon the average frequency domain channel estimates. The pilot modulation error ratio for the pilot symbol is based at least in part upon the noise variance for the pilot symbol.

In yet another aspect, an apparatus includes means for generating an average frequency domain channel estimate for each of a plurality of subcarriers over a unit of data of a transmitter signal. The apparatus also includes means for determining pilot symbol noise for each of the subcarriers associated with a pilot symbol based upon the average frequency domain channel estimate for each of the plurality of subcarriers and means for determining average noise variance for the pilot symbol based at least in part upon the pilot symbol noise for each of the subcarriers associated with the pilot symbol. In addition, the apparatus includes means for generating a pilot modulation error ratio indicative of transmitter performance based at least in part upon the average noise variance for the pilot symbol and the average frequency domain channel estimate for each of the subcarriers.

In another aspect, a computer-readable medium includes a computer program that includes instructions for generating an average frequency domain channel estimate for each of a plurality of subcarriers for a unit of data of a transmitter signal and for determining pilot symbol noise for each of the subcarriers associated with a pilot symbol based upon the average frequency domain channel estimate for each of the plurality of subcarriers. In addition, the computer program includes instructions for determining average noise variance for the pilot symbol based at least in part upon the pilot symbol noise for each of the subcarriers associated with the pilot symbol and generating a pilot modulation error ratio indicative of transmitter performance based at least in part upon the average noise variance for the pilot symbol and the average frequency domain channel estimate for each of the plurality of subcarriers.

In yet another aspect, a processor executes instructions that include generating an average frequency domain channel estimate for each of a plurality of subcarriers over a unit of data of a transmitter signal and determining pilot symbol noise for each of the plurality of subcarriers associated with a pilot symbol based upon the average frequency domain channel estimate for each of the plurality of subcarriers. The processor can also execute instructions for determining average noise variance for the pilot symbol based at least in part upon the pilot symbol noise for each of the plurality of subcarriers associated with the pilot symbol and generating a pilot modulation error ratio indicative of transmitter performance based at least in part upon the average noise variance for the pilot symbol and the average frequency domain channel estimate for each of the plurality of subcarriers.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
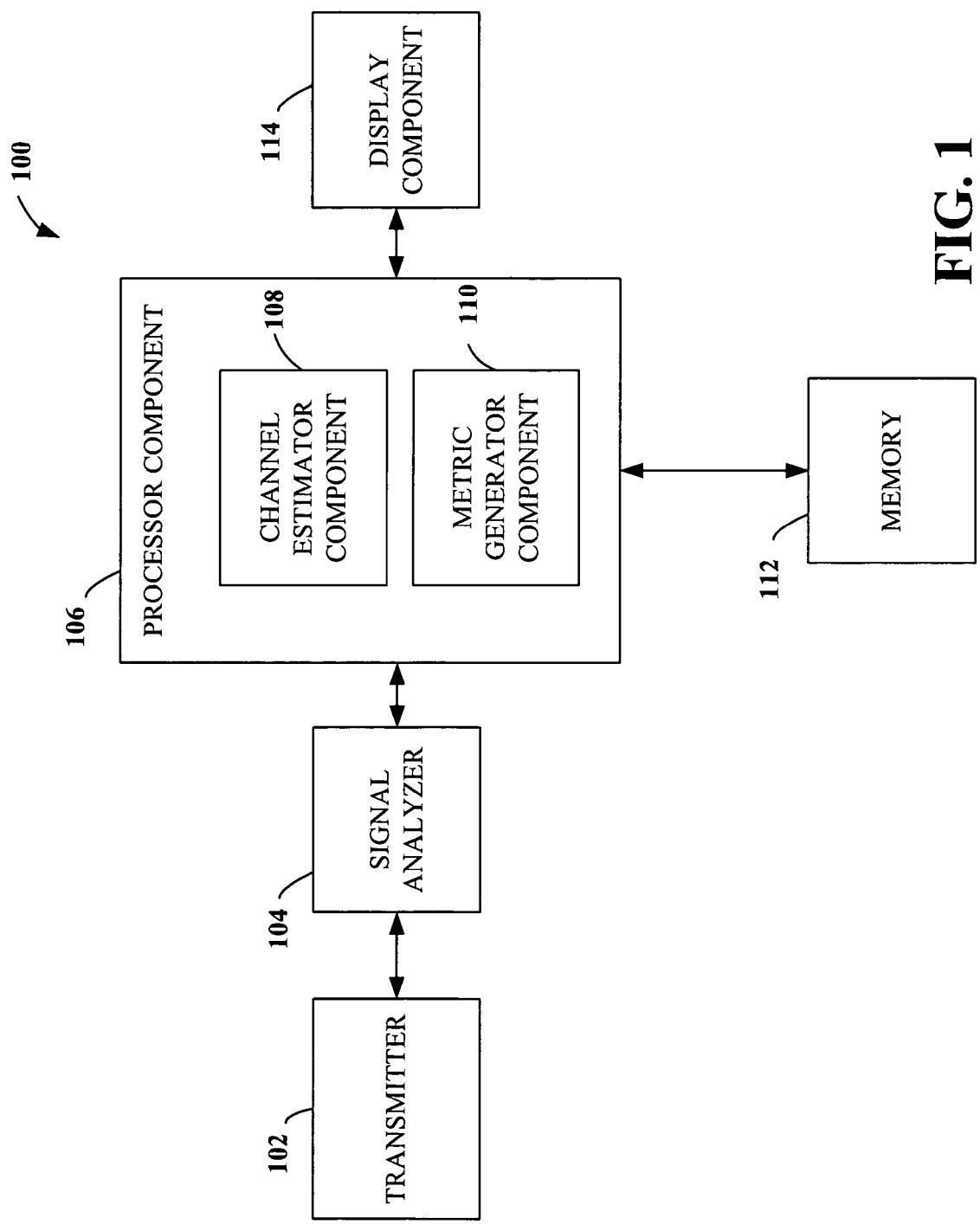
FIG. 1 is an illustration of a transmitter evaluation system according to one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment (UE). A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

The FLO wireless system has been designed to broadcast real time audio and video signals, as well as non-real time services. The FLO transmission is carried out utilizing tall, high power transmitters to ensure wide coverage in a given geographical area. It is common to deploy multiple transmitters in markets to ensure that the FLO signal reaches a significant portion of the population in a given market.

Typically, FLO technology utilizes orthogonal frequency division multiplexing (OFDM). Frequency division based techniques, such as OFDM, generally separate the frequency spectrum into distinct channels by splitting the frequency spectrum into uniform chunks of bandwidth. For example, the frequency spectrum or band allocated for wireless cellular telephone communication can be split into 30 channels, each of which can carry a voice conversation or, for digital service, digital data. Each channel can be assigned to only one user device or terminal at a time. OFDM effectively partitions the overall system bandwidth into multiple orthogonal frequency channels. An OFDM system may use time and/or frequency division multiplexing to achieve orthogonality among multiple data transmissions for multiple terminals. For example, different terminals may be allocated different channels, and the data transmission for each terminal may be sent on the channel(s) allocated to this terminal. By using disjoint or non-overlapping channels for different terminals, interference among multiple terminals may be avoided or reduced, and improved performance may be achieved.

Base station transmitter performance is vital to the overall performance of a wireless system, particularly a wireless system utilizing FLO technology. Therefore, a system and/or method for testing and evaluating transmitters should be accurate and cost-effective. Transmitters can be tested at the factory or before installation to qualify the transmitters for installation. In addition, transmitters can be tested or monitored after installation to ensure continued transmitter performance. The system and methods described herein can be used to evaluate transmitter performance in wireless environments including, but not limited to, a wireless environment broadcasting FLO, digital multimedia broadcasting (DMB), digital video broadcasting (DVB), DVB-H, DVB-T, DVB-S or DVB-S2 signals.

Referring now to FIG. 1, a transmitter evaluation system 100 in accordance with various aspects presented herein is illustrated. System 100 can include a signal analyzer 104 that can be used to sample a signal generated by a transmitter 102. By using signal analyzer 104 rather than a receiver to receive the signal, system 100 can eliminate the receiver as a possible source of additional noise and distortion. System 100 can also include a processor component 106 capable of processing the signal captured by signal analyzer 104 and generating one or more metrics to evaluate the performance of transmitter 102. Processor component 106 can include a channel estimator component 108 that can be used to generate frequency domain channel estimates for each subcarrier of the received signal. The received signal is the signal as received or measured by the evaluation system 100. Processor component 106 can also include a metric generator component 110 that generates one or more metrics, such as a modulation error ratio (MER) based upon the pilot symbols, to evaluate performance of transmitter 102. The metrics produced by metric generator component 110 can be based in part upon the frequency domain channel estimates produced by channel estimator component 108. System 100 can also include a memory 112 connected to processor component 106 that contains data relating to transmitter performance evaluation (e.g., symbol data and metric data). In addition, system 100 can include a display component 114 to allow a user to monitor transmitter performance through visual feedback generated by the processor component 106.

Processor component 106 can provide various types of user interfaces for display component 116. Processor component 106 can provide a graphical user interface (GUI), a command line interface and the like. For example, a GUI can be rendered that provides a user with a region to view transmitter information. The region can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed.

In an example, a command line interface can be employed. For example, the command line interface can prompt (e.g., by a text message on a display and an audio tone) the user for information by providing a text message or alert the user that the transmitter performance is outside of predetermined bounds. It is to be appreciated that the command line interface can be employed in connection with a GUI and/or application program interface (API). In addition, the command line interface can be employed in connection with hardware (e.g., video cards) and/or displays (e.g., black and white, and EGA) with limited graphic support, and/or low bandwidth communication channels.

In addition, the evaluation system 100 can generate an alert to notify users when transmitter performance is outside of a predetermined acceptable range. The alert can be audio, visual or any other form intended to notify a user of performance. Evaluation system 100 can include a predetermined set of values indicating the boundaries of the acceptable range. Alternatively, users may dynamically determine the boundaries. In addition, the evaluation system 100 can generate an alert based upon a change in transmitter performance.

Figure 2:
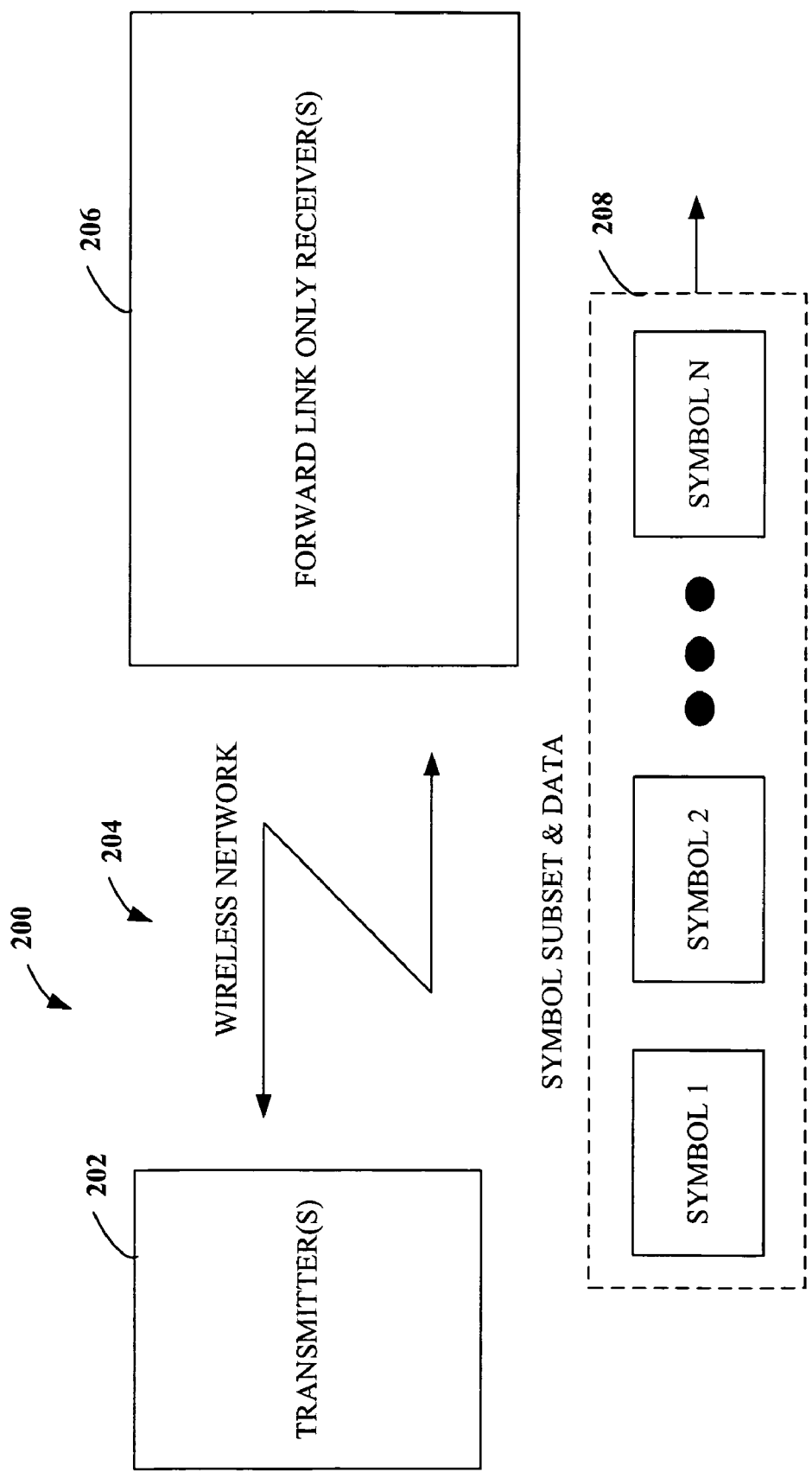
FIG. 2 is an illustration of a wireless communication system according to one or more aspects presented herein.

FIG. 2 illustrates a wireless network system 200 for forward link only networks. The system 200 includes one or more transmitters 202 that communicate across a wireless network 204 to one or more user devices or receivers 206. The receivers 206 can include substantially any type of communicating device such as a cell phone, computer, personal assistant, hand held or laptop devices, and so forth. Portions of the receiver 206 are employed to decode a symbol subset 208 and other data such as multimedia data. The symbol subset 208 is generally transmitted in an Orthogonal Frequency Division Multiplexing (OFDM) network that employs forward link only (FLO) protocols for multimedia data transfer.

Figure 3:
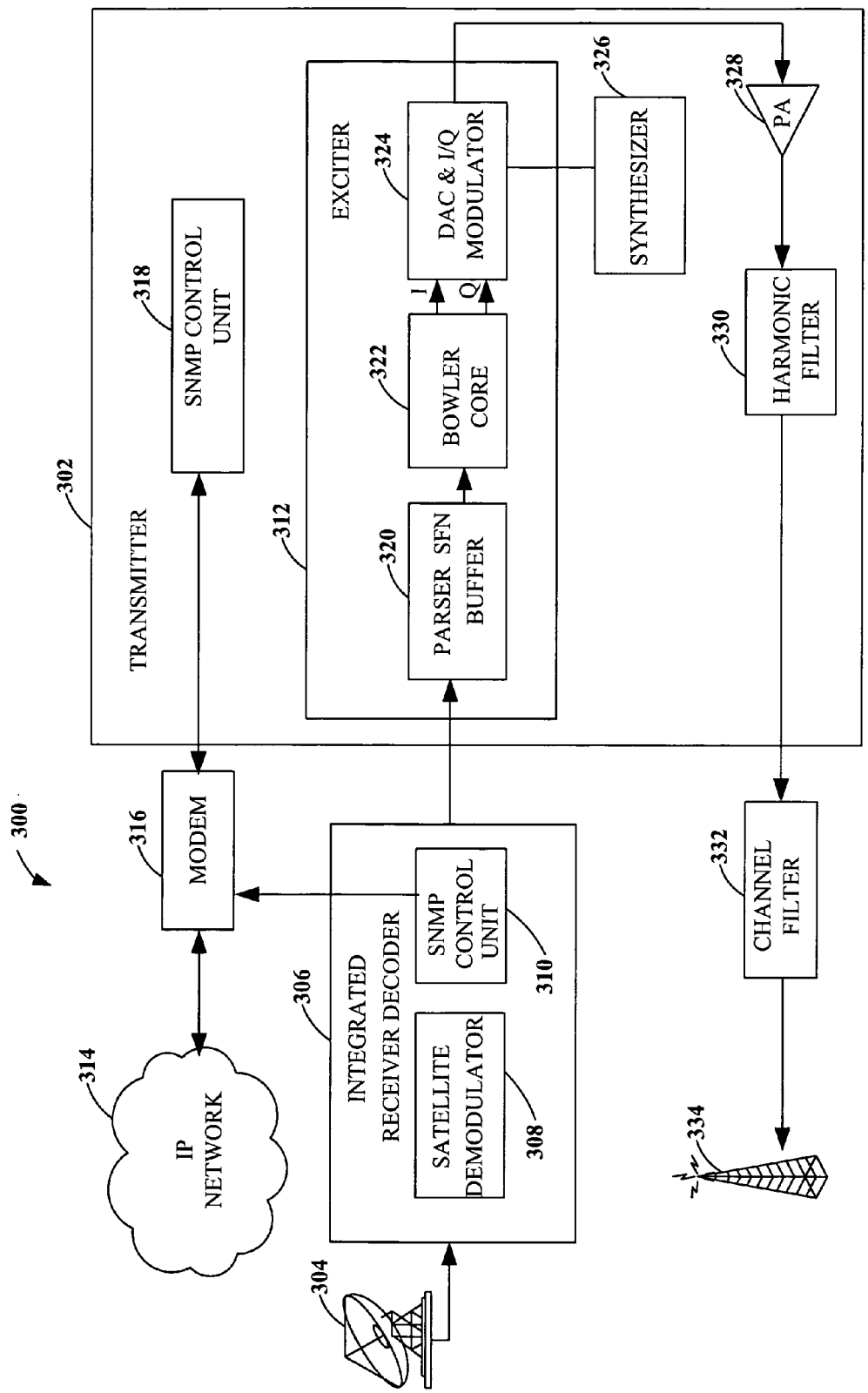
FIG. 3 is an illustration of a wireless communication system according to one or more aspects presented herein.

FIG. 3 is an illustration of a wireless communication system 300. System 300 includes a transmitter 302 that can receive data for transmission from a communication satellite system 304. Signals from satellite system 304 can be propagated through an integrated receiver decoder 306 that can include a satellite demodulator 308 and a simple network management protocol (SNMP) control unit 310. Signal data from integrated receiver decoder 306 can be input into an exciter 312 within transmitter 302. In addition, transmitter 302 can be connected to an Internet provider (IP) network 314 through a modem 316. Modem 316 can be connected to a SNMP control unit 318 within transmitter 302. Exciter 312 can include a parser and single frequency network (SFN) buffer 320, a bowler core 322 and a digital to analog converter (DAC) and I/Q modulator 324. Signal data from satellite system 304 can be parsed and stored in parser and SFN buffer 320. Bowler core 322 can generate complex numbers representing the signal data, passing the signal data to DAC and I/Q modulator 324 as in-phase (I) and quadrature (Q) components. DAC and I/Q modulator 324 can utilize a synthesizer 326 to process the signal data and produce an analog, radio frequency (RF) signal. After the data is converted to analog, the resulting RF signal data can be passed to a power amplifier 328 and through a harmonic filter 330. In addition, the data can be passed through a channel filter 332 prior to transmission by antenna 334.

To evaluate transmitter performance, the RF signal data produced by exciter 312 can be monitored prior to transmission to isolate transmitter errors. Possible sources of transmitter error or noise include up-sampling, digital to analog conversion and RF conversion. The signal data can be sampled at the output of the exciter and at the output of the channel filter, such that the RF signal can be sampled either before or after power amplification and filtering. If the signal is sampled after amplification, the signal should also be corrected for power amplification nonlinearity.

Figure 4:
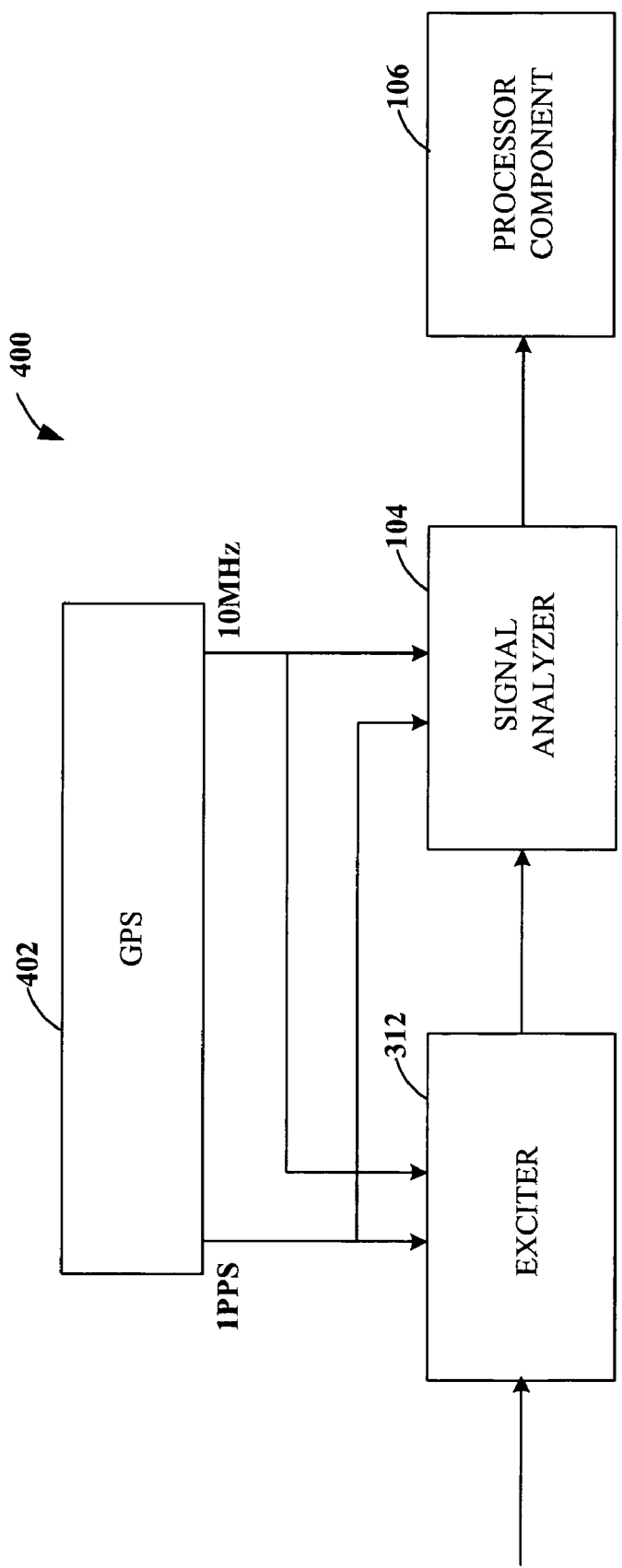
FIG. 4 is an illustration of a transmitter evaluation system according to one or more aspects presented herein.

Referring now to FIG. 4, a transmitter evaluation system 400 connected to a transmitter system exciter 312 is illustrated. Signals from a global positioning system (GPS) receiver 402 can be used to synchronize transmitter exciter 312 and signal analyzer 104. An external 10 Megahertz clock from GPS receiver 402 can be fed into both exciter 312 and signal analyzer 104 to act as a common clock reference. To synchronize the start of sampling by signal analyzer 104 to the beginning of the superframe of the RF signal data output by exciter 312, GPS 402 can transmit a 1 pulse per second (1 PPS) signal to exciter 312 for synchronization and to signal analyzer 104 to trigger the start of sampling. The RF signal is made up of superframes, where a superframe can include a group of frames (e.g., 4 frames) and a frame is a logical unit of data. Superframes are discussed in further detail with respect to FIG. 5. Signal analyzer 104 can generate digital samples of exciter analog output waveform at a rate that is synchronous to the baseband chip rate of the transmitted signal. Sampled data can then be fed into processor component 106. Processor component 106 can be implemented using a general-purpose processor or a processor dedicated to analyzing transmitter data. Use of a general-purpose processor can reduce the cost of transmitter evaluation system 400. Signal analyzer 104 can be configured to run in floating point mode to avoid quantization noise.

Figure 5:
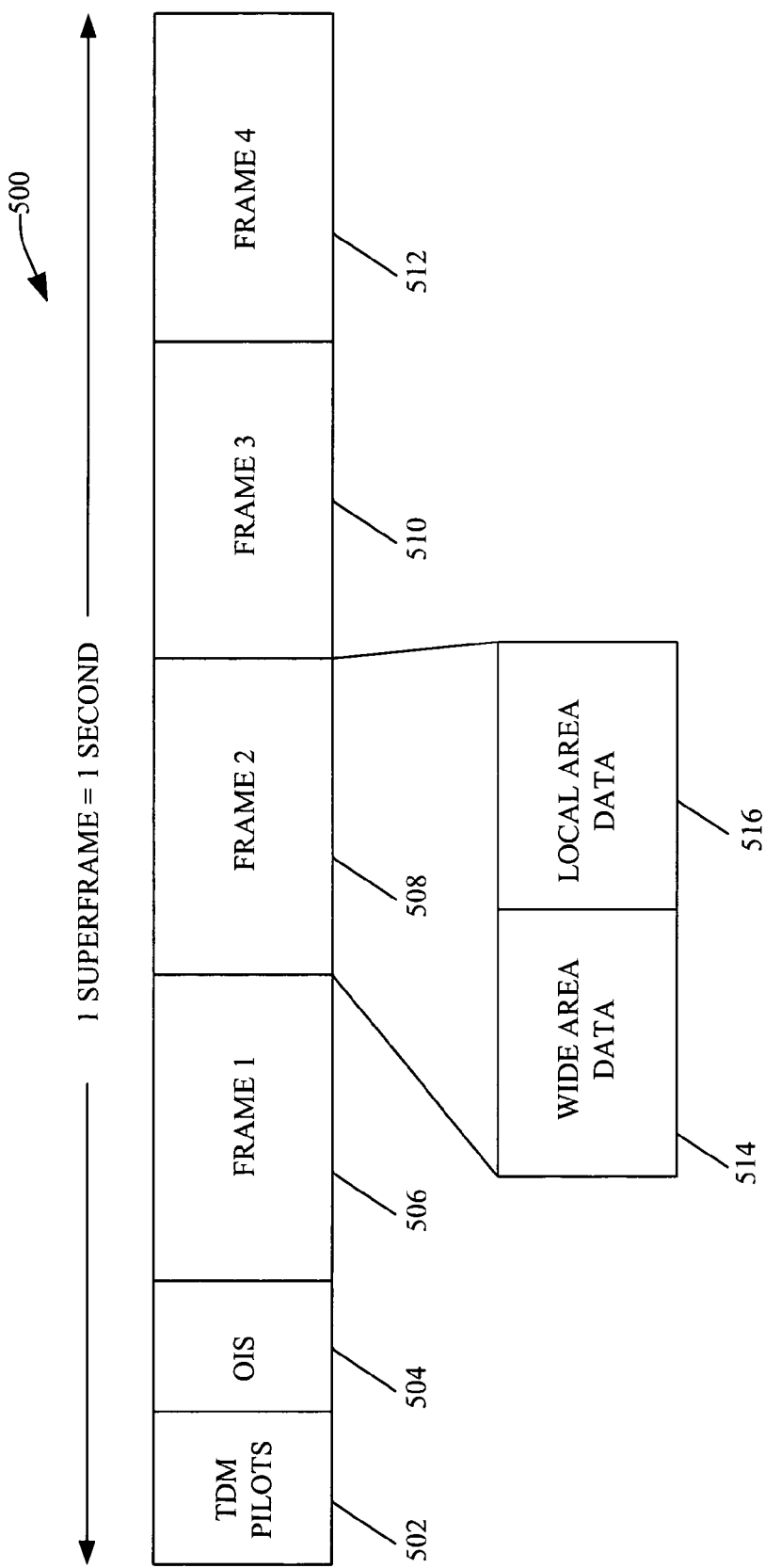
FIG. 5 is an illustration of an exemplary data structure and signal for a wireless system.

Proceeding to FIG. 5, a FLO physical layer superframe 500 is illustrated. In an embodiment, a superframe can be equal to 1200 OFDM symbols with a one second time duration for 6 Mhz bandwidth case. Generally, FLO transmitted signals are organized into superframes as illustrated at 500. Each superframe can be comprised of four frames of data, including TDM pilot symbols (Time Division Multiplexed) 502, Overhead Information Symbols (OIS) 504 and frames 506, 508, 510, 512, containing wide-area 514 and local-area data 516. The pilot symbols can include four predefined pilot symbols: time division multiplexed 1 (TDM1), wide area identification channel (WIC), local area identification channel (LIC) and time division multiplexed 2 (TDM2). The pilot symbols can be used for synchronization, timing and identification purposes. Consequently, the structure of pilot symbols are distinct from those of the OFDM data symbols contained with the four frames of data 506, 508, 510 and 512. The pilot symbols can allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol can contain 7 interlaces of active subcarriers. For example, each symbol can include 4096 subcarriers, with 4000 subcarriers available for data. Each interlace of active subcarriers is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Figure 6:
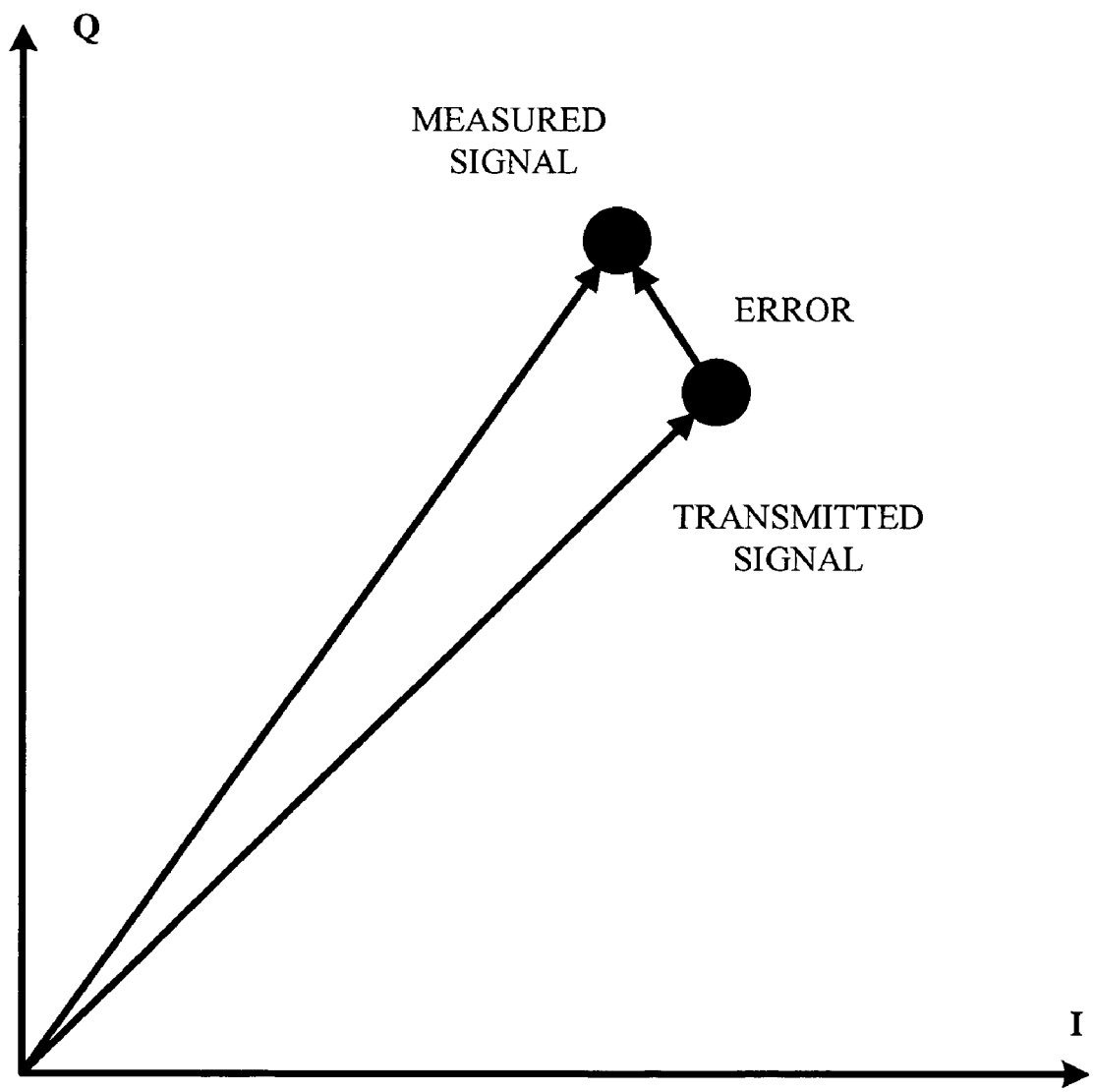
FIG. 6 is a constellation diagram illustrating the difference between measured signal and transmitted signal.

Referring now to FIG. 6, a constellation diagram illustrating the difference between received or measured signal and transmitted signal is shown. The axes of the constellation diagram represent the real and imaginary components of complex numbers, referred to as the in phase or I-axis and the quadrature or Q-axis. The vector between the received or measured signal constellation point and the transmitted signal constellation point represents the error, which can include digital to analog conversion inaccuracies, power amplifier nonlinearities, in-band amplitude ripple, transmitter IFFT quantization error and the like.

The transmitter evaluation system can generate one or more metrics to evaluate the performance of the transmitter. Metrics generated by processor include, but are not limited to, modulation error ratio (MER), pilot modulation error ratio, group delay or channel frequency response. In particular, MER measures the cumulative impact of flaws within the transmitter. MER for a subcarrier is equivalent to signal to noise ratio (SNR) for a subcarrier. MER can be generated using the following equation:

$$MER \text{ (dB)} = 10\log \frac{\frac{1}{N}\sum_{1}^{N}(I^2 + Q^2)}{\frac{1}{N}\sum_{1}^{N}(\Delta I^2 + \Delta Q^2)}$$

Here, I is the in phase value of the measured constellation point, Q is the quadrature value of the measured constellation point and N is the number of subcarriers. ΔI is the difference between the in phase values of the transmitted and measured signals and ΔQ is the difference between the quadrature values of the transmitted and measured signals.

A separate pilot MER metric can be determined for each of the four pilot symbols. A pilot MER for each of the pilot symbols can provide a single figure of merit for each pilot symbol. Computation or generation of a pilot MER is discussed in detail with respect to FIG. 8.

Referring to FIGS. 7-12 and 14-16, methodologies relating to evaluating transmitter performance in wireless communication systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 7:
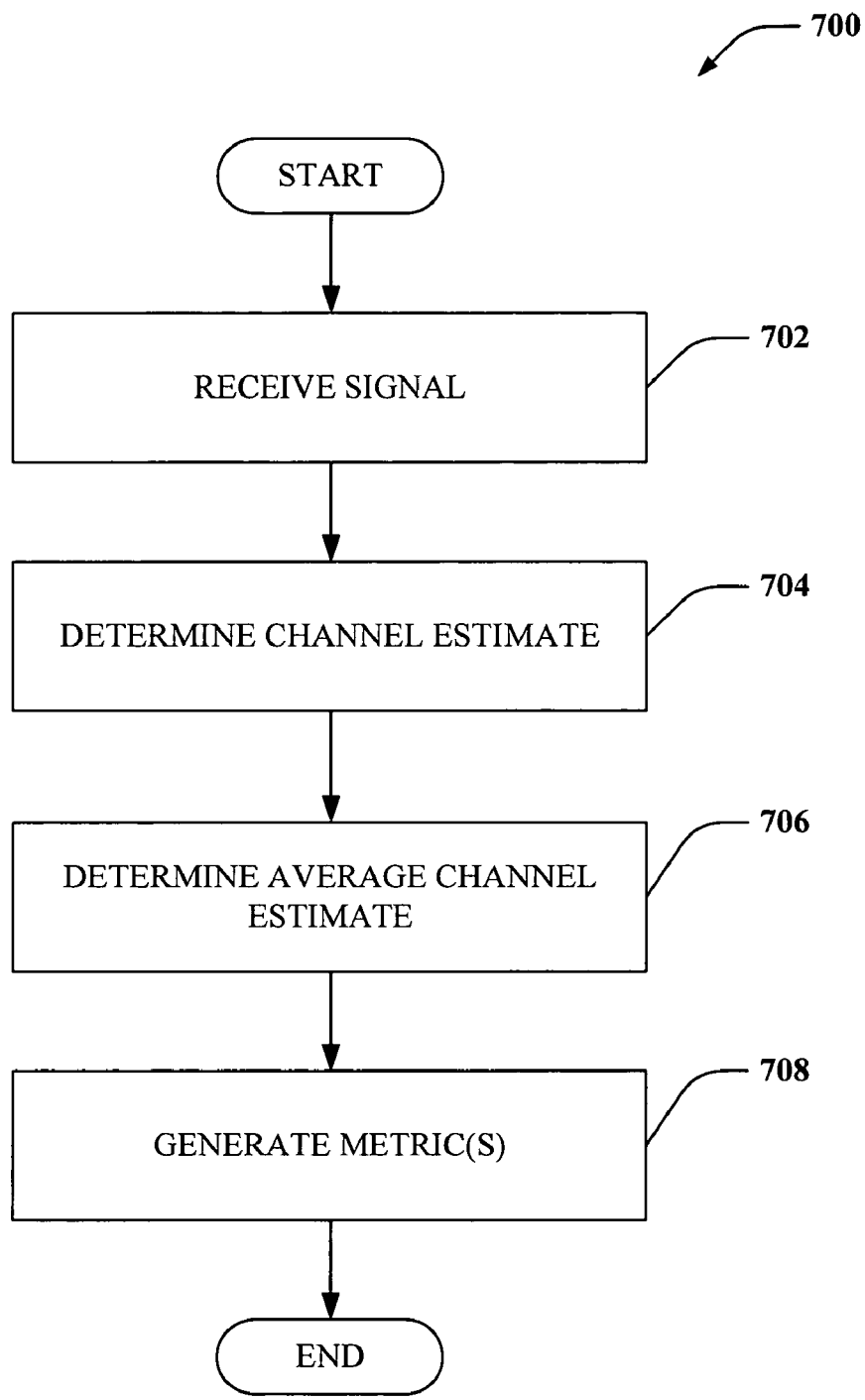
FIG. 7 illustrates a methodology for evaluating a transmitter in accordance with one or more aspects presented herein.

Referring now to FIG. 7, a methodology 700 for processing RF signal data received from a transmitter and evaluating transmitter performance is illustrated. At 702, the signal is received or sampled from the transmitter. The received signal can be written as follows:

$Y_k = H_k \cdot P_k + N_k$

Here, $H_k$, is the channel of a subcarrier, k. A known modulation symbol, $P_k$, can be transmitted on the subcarrier k. Complex additive white Gaussian noise (AWGN) with a zero mean and a variance of $\sigma^2$ can be represented by $N_k$.

The possible modulation types for the subcarriers for data OFDM symbols can include, but are not limited to, quadrature phase-shift keying (QPSK), layered QPSK with an energy ratio of 6.25 (ER6.25), 16 QAM (quadrature amplitude modulation) and layered QPSK with energy ratio of 4.0 (ER4). Subcarriers of pilot symbols are generally of QPSK modulation type. When analyzed based upon the constellation point of view, the layered QPSK modulation type with energy ratio 4.0 is identical to that of 16 QAM. Constellation point of view, as used herein, refers to utilization of constellation diagrams to represent digital modulation schemes in the complex plane. Modulation symbols can be represented as constellation points on a constellation diagram.

An initial frequency domain channel estimate for a subcarrier can be determined at 704. An initial channel estimate for each subcarrier can be obtained by dividing the signal, $Y_k$, for subcarrier k, by a known symbol, $P_k$ for subcarrier k. Selected symbols can be transmitted, such that the symbols are known for the purpose of performance evaluation. For example, during testing prior to installation, a particular pattern of symbols can be transmitted such that the symbol for each subcarrier is predictable and therefore known. Determination of modulation symbols when the transmitted modulation symbols are unknown is discussed in detail below. The initial frequency domain channel estimate for each subcarrier, k, of every OFDM symbol, l, within a superframe, can be represented as follows:

$$Z_{k,l} = Y_{k,l}/P_{k,l} = H_{k,l} + \frac{N_{k,l} \cdot P_{k,l}^*}{|P_{k,l}|^2}$$

Here, $Z_{k,l}$ is an initial channel estimate for subcarrier k and OFDM symbol l.

An average channel estimate for each subcarrier can be determined at 706. The channel estimate $Z_{k,l}$ of a subcarrier can be refined by averaging over the entire superframe, such that:

$$\hat{H}_k = H_k + \frac{1}{L}\sum_{l=0}^{L-1} \frac{N_{k,1} \cdot P_{k,1}^*}{|P_{k,1}|^2}$$

Here, k is the OFDM symbol index and L is the number of the OFDM symbols in the superframe (e.g., 1188 symbols). Since the variance of the average channel estimate is smaller than the variance of the initial channel estimate, the variance of the average channel estimate can be used to approximate the channel gain of the subcarrier during metric generation.

At 708, one or more metrics for evaluating the transmitter performance are generated. For example, the MER for data symbols for a subcarrier k can be generated. Assuming that the transmitted OFDM data symbols are known, noise variance can be estimated by the following:

$$W_{k,m} = Y_{k,m} - \hat{H}_k \cdot X_{k,m} = N_{k,m} - \frac{1}{L}\sum_{l=0}^{L-1} \frac{N_{k,l} \cdot X_{k,l}^*}{|X_{k,l}|^2} \cdot X_{k,m}$$

Here, $X_{k,m}$ represents the transmitted symbol for subcarrier k. It can be shown that the in-phase and quadrature components of the noise, $W_k$, is approximately:

$$N\left(0, \left(1 - \frac{1}{L}\right)\frac{\sigma^2}{2}\right)$$

if random variable $B_k$ is the estimated noise variance, such that:

$$B_k = \frac{1}{L-1}\sum_{l=1}^{L} W_{k,l}^2$$

and:

$$E(B_k) = \frac{L}{L-1} E(W_k^2) = \sigma^2$$

The MER for a subcarrier can be determined based upon the average channel estimate for the subcarrier, the symbol transmitted on the subcarrier and the signal received for the subcarrier. A MER can be calculated based upon the following exemplary equation:

$$MER_k = \frac{E|H_k \cdot P_k|^2}{E|Y_k - H_k \cdot P_k|^2} = \frac{E|H_k|^2 \cdot E|P_k|^2}{E|N_k|^2} \approx \frac{E|\hat{H}_k|^2 \cdot E|P_k|^2}{E(B_k)}$$

Here, $\hat{H}_k$ is the average channel estimate for subcarrier k, $P_k$ is the symbol transmitted on the subcarrier, $Y_k$ is the received signal and $N_k$ is the AWGN. In addition, MER can be calculated by averaging over all of the subcarriers.

In addition to MERs generated using OFDM data symbols, one or more pilot modulation error ratios or pilot MERs can be generated. A pilot MER is specific to one of the specific pilot symbols (e.g., TDM1, WIC, LIC and TDM2). Pilot MERs are distinct from OFDM data symbol MERs due to the difference between pilot symbols and data symbols. In addition, pilot symbols are identical over all superframes. Accordingly, the pilot symbols are known regardless of what data symbols are transmitted.

Figure 8:
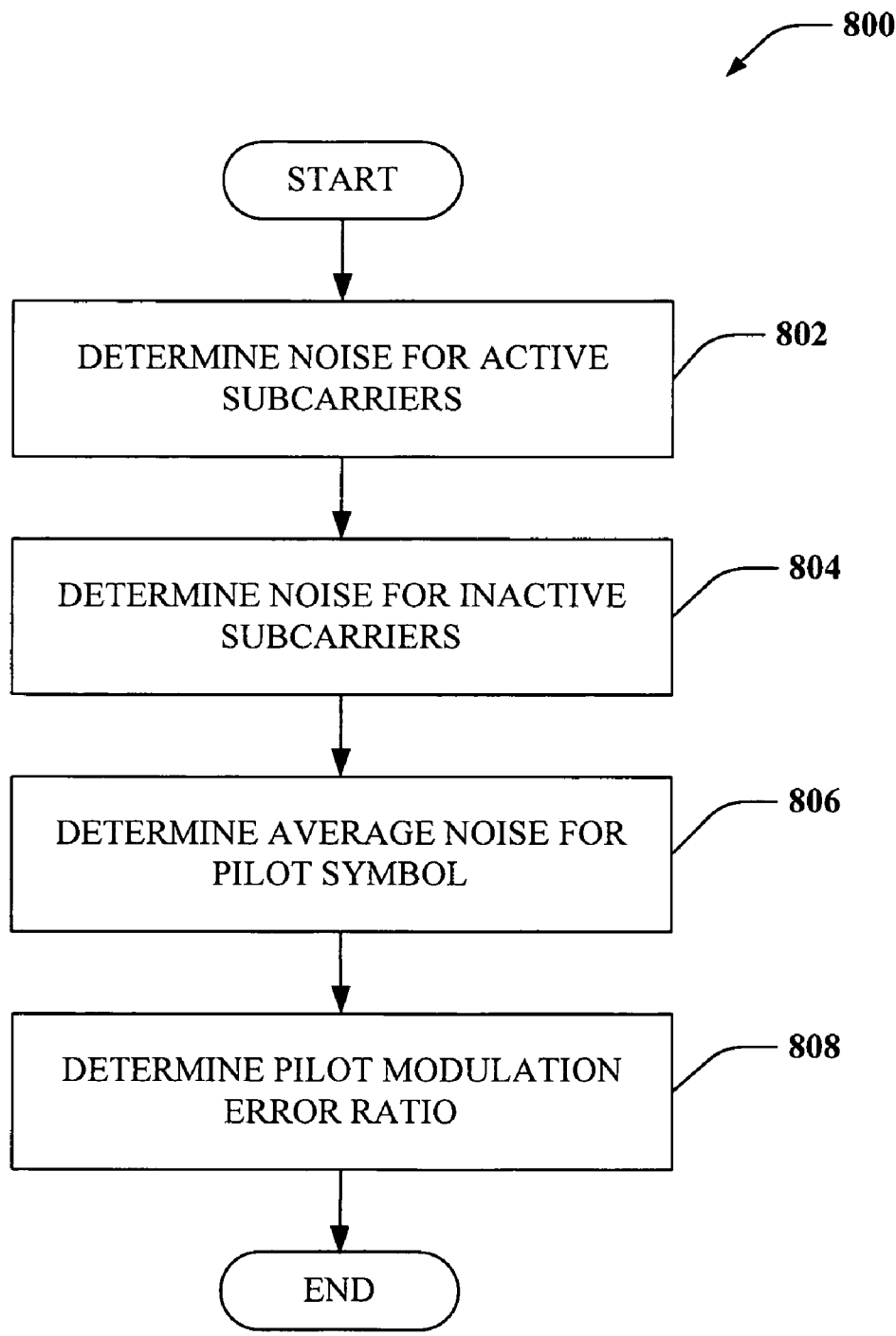
FIG. 8 illustrates a methodology for generating a modulation error ratio for a pilot symbol in accordance with one or more aspects presented herein.

Referring now to FIG. 8, a methodology 800 for generating a pilot MER is illustrated. A pilot MER can be generated for each or any of the pilot symbols (e.g. TDM1, WIC, LIC and TDM2). At 802, the noise or error for each active subcarrier within the pilot symbol can be computed. Subcarriers that are utilized by the pilot symbols are referred to herein as active subcarriers, and the unused subcarriers can be referred to as inactive subcarriers. For each of the four pilot symbols a predetermined set of subcarriers can be used to transmit the pilot symbol. In contrast to OFDM data symbols, where all or most of the subcarriers can be used to transmit data, pilot symbols can utilize a significantly smaller portion of the subcarriers. For example, the TDM1 pilot can utilize 124 subcarriers, the TDM2 pilot symbol can utilize 2000 subcarriers and the WIC and LIC pilot symbols can each utilize 500 subcarriers out of the available 4000 subcarriers. For active subcarriers, the noise for each subcarrier of one of the four pilot symbols can be generated using the following exemplary equation:

$$W_{k,l} = Y_{k,l} - \hat{H}_k \cdot X_{k,l}$$

Here, $W_{k,l}$ is the noise or error for a subcarrier k, and l represents one of the four pilot symbols (e.g., TDM1, WIC, LIC and TDM2), such that $l \in \{0,1,2,3\}$. As discussed above, $Y_{k,l}$ is the received signal for subcarrier k and pilot symbol l, $\hat{H}_k$ is the average channel estimate for subcarrier k over the superframe and $X_{k,l}$ represents the transmitted modulation symbol for subcarrier k of pilot symbol l. For the pilot symbols, the symbols are known. Consequently, the noise or error can be calculated.

At 804, noise can be determined for all inactive subcarriers of the pilot symbol. For inactive subcarriers, the noise can be determined using the following exemplary equation:

$$W_{k,l} = Y_{k,l}$$

Here, because the subcarriers are not utilized for the pilot symbol, the received signal is just noise.

At 806, After the noise or error has been computed for each of the subcarriers of the pilot symbols, the average noise variance across all of the subcarriers can be generated for the pilot symbol using the following exemplary equation:

$$B_l = \frac{1}{4000 + \frac{N_l}{L}} \sum_m^{4000} |W_{m,l}|^2$$

Here, $N_l$ is the number of active subcarriers for OFDM symbol l. For example, for TDM1 $N_l$ can be 124, for TDM2 $N_l$ can be 2000 and for WIC and LIC $N_l$ can be 500. The noise variance is summed for all subcarriers of the pilot symbol. The sum of the noise variance is divided by the number of subcarriers (e.g., 4,000) and a scaling factor $N_l/L$, where L is a constant. The scaling factor can be used to ensure that the pilot MER is comparable in scale to MERs generated using OFDM data symbols. Significantly fewer subcarriers are active for pilot symbols as compared to OFDM data symbols. The signal power for OFDM pilot symbols the same or similar to that of OFDM data symbols. To generate equivalent signal power with significantly fewer active subcarriers, the scale of active subcarriers for pilot symbols is much higher than that of data symbols. The scaling factor used to determine noise variance for the pilot symbol can be based upon the number of active subcarriers of the pilot symbol, ensuring that the noise variance is comparable to that of OFDM data symbols.

After calculation of noise variance, at 808 the pilot MER for one or more pilot symbols can be calculated. The following exemplary equation can be used to calculate MER for any of the pilot symbols, l:

$$MER_l = \frac{1}{4000} \frac{\sum_k^{4000} |\hat{H}_k|^2 |X_{k,l}|^2}{B_l}$$

Here again, $\hat{H}_k$ is the average channel estimate for subcarrier k, $X_{k,l}$ is the known modulation symbol for subcarrier k of pilot symbol l and $B_l$ is the noise variance for the pilot symbol l. Pilot MER can generated for each of the four pilot symbols (e.g., TDM1, WIC, LIC and TDM2).

Figure 9:
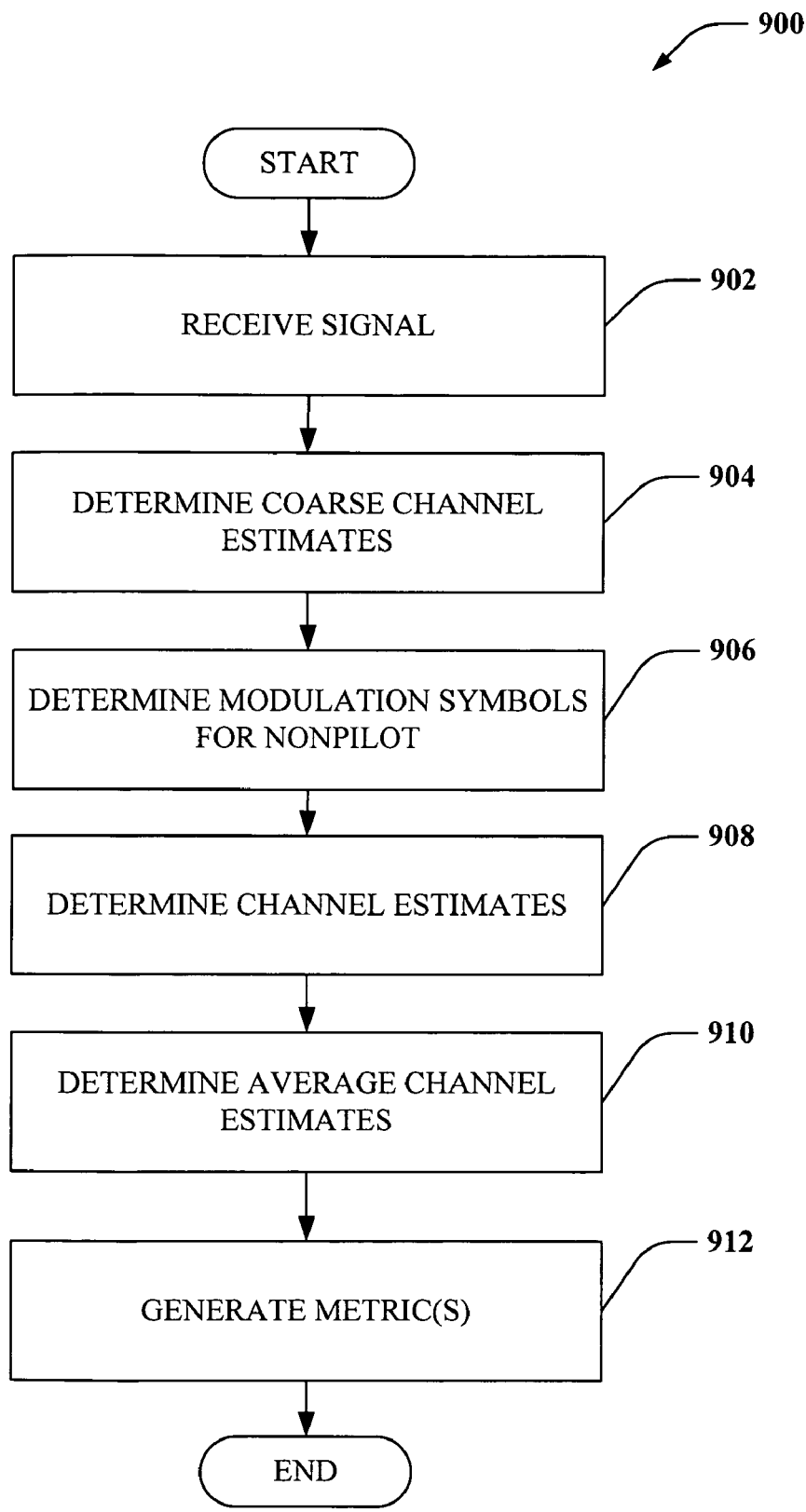
FIG. 9 illustrates a methodology for evaluating a transmitter in accordance with one or more aspects presented herein.

Referring now to FIG. 9, a methodology 900 for evaluating a transmitter where the transmitted symbols are unknown is illustrated. The modulation symbols (e.g., QPSK or 16 QAM symbols) are unknown when real time data streams are transmitted. However, the pilot symbols are known. At 902, a signal is received. A coarse initial channel estimate for the subcarriers can be generated at 904. The coarse initial channel estimation can be performed using the known pilot symbols and linear interpolation and extrapolation, as described with respect to FIG. 10 below. At 906, the modulation symbols for the subcarriers are determined. The modulation symbols can be determined using a constellation diagram as described below with respect to FIGS. 11 through 14. The modulation symbols can be selected based upon the distance between the received signal constellation point and the closest modulation symbol constellation point. Symbol selection is described in further detail below. At 908, an initial frequency domain channel estimate for each subcarrier can be determined. An initial channel estimate for each subcarrier can be obtained by dividing the received signal by the modulation symbol.

At 910, the channel estimates are averaged over the superframe to increase accuracy. The average channel estimate can be determined using the coarse channel estimates, the channel estimates based upon the modulation symbols or both sets of channel estimates. One or more metrics for evaluating the transmitter based at least in part upon the channel estimates can be generated at 912. For example, the MER for each subcarrier can be determined based upon the channel estimates and the modulation symbol, as described in detail above. Additionally, a pilot MER for each pilot symbol can be generated.

Figure 10:
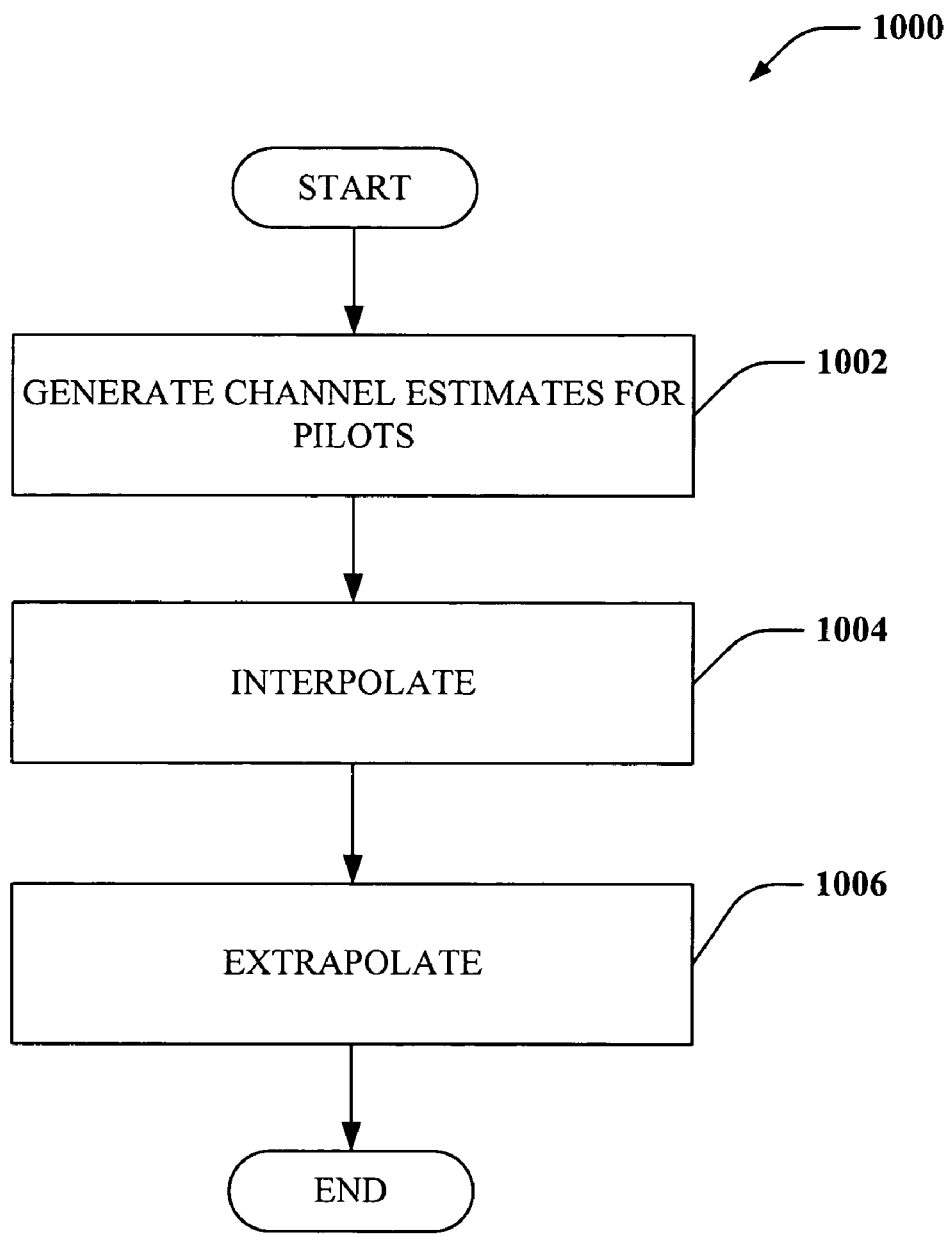
FIG. 10 illustrates a methodology for generating coarse channel estimates in accordance with one or more aspects presented herein.

Referring now to FIG. 10, a methodology 1000 for generating coarse channel estimates is illustrated. As discussed in detail above, the received signal can be written as a function of the channel estimate, the symbol for the subcarrier and a noise term, AWGN. In each OFDM symbol, there are a predetermined number of subcarriers carrying pilot symbols known to the receiver, (e.g., 500 subcarriers carrying pilot QPSK symbols). Therefore, the modulation symbols are known for this subset of subcarriers. Consequently, at 1002 the channel estimate can be calculated for the pilot subcarriers. At 1004, the channel estimates for subcarriers between two pilot subcarriers can be obtained using linear interpolation. At 1006, the channel estimates for subcarriers at the ends of the super frame, and consequently not located between pilot subcarriers, can be obtained using linear extrapolation.

In addition, since there is (2, 6) pattern staggering of pilot symbols for the OFDM symbols of a super frame, both the 500 pilots of the current OFDM symbol and the 500 pilots of the previous OFDM symbol can be used to obtain the frequency domain channel estimation. In such cases, the channel estimates of the pilot subcarriers are generated using the pilot symbols and the channel estimates of the rest of the subcarriers are obtained by linear interpolation or extrapolation.

Figure 11:
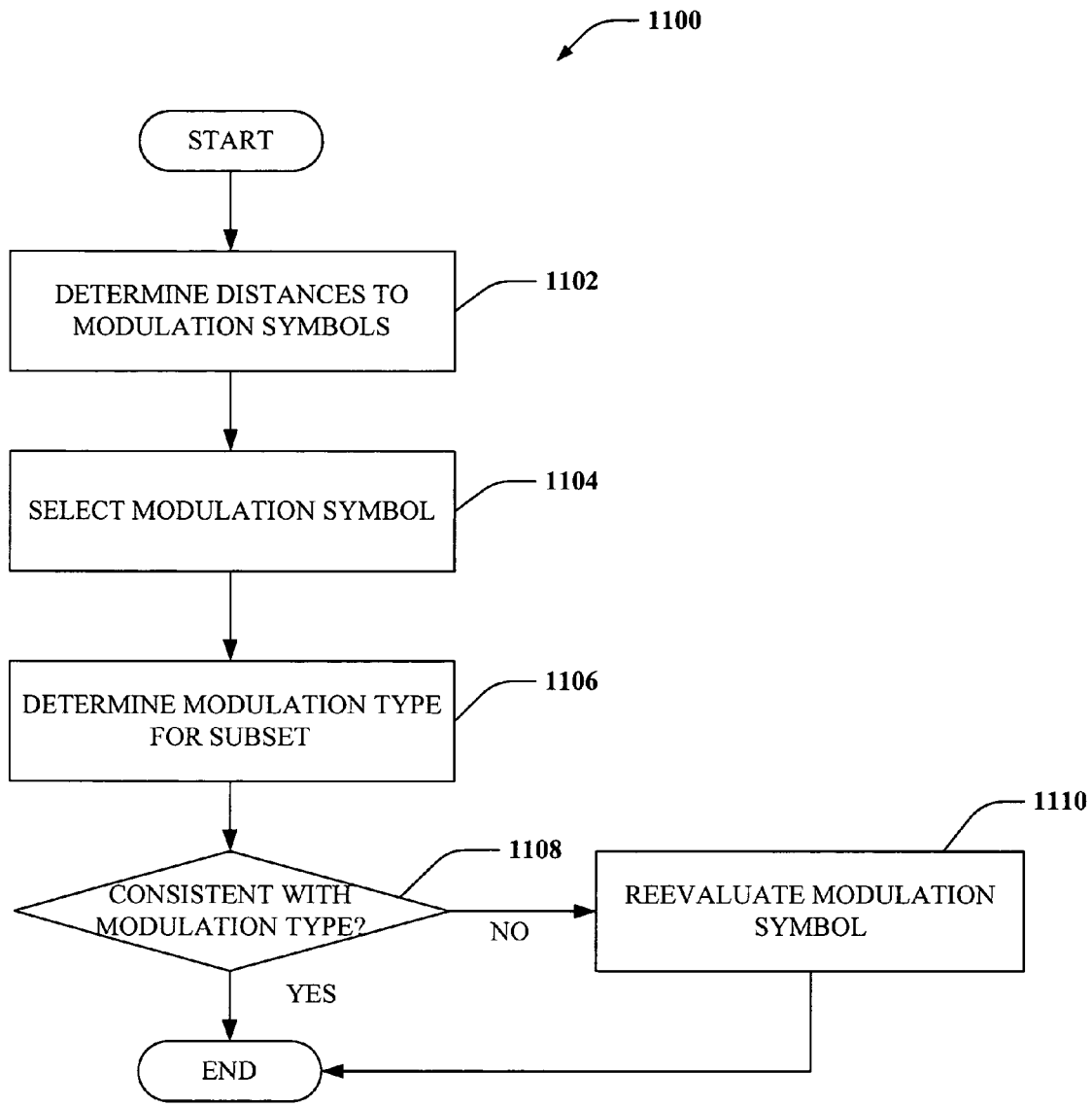
FIG. 11 illustrates a methodology for determining modulation symbols in accordance with one or more aspects presented herein.

Referring now to FIG. 11, a methodology 1100 for determining modulation symbols is illustrated. At 1102, the distances between the constellation point of the received signal and the constellation points of possible modulation symbols are calculated. For example, the distance between the received signal constellation point and the QPSK constellation point closest the signal constellation point, as well as the distance between the signal constellation point and the 16 QAM constellation point closest to the signal constellation point can be calculated. At 1104, the modulation symbol constellation point closest to the signal constellation point is selected as the modulation symbol. To increase accuracy in selection of modulation symbols, the modulation symbol can be compared to the modulation type for a subset of the subcarriers having a consistent modulation type. Errors in modulation symbol selection can be avoided by checking the modulation symbol for a subcarrier against the modulation type for the subset of subcarriers. The modulation type for the subset of subcarriers can be determined at 1106. At 1108, it is determined whether the modulation symbol is consistent with the modulation type. If yes, the process terminates. If no, the modulation symbol is reevaluated and a modulation symbol consistent with the modulation type is selected at 1110.

Typically, the modulation type remains consistent during a half interlace. A half-interlace is used herein as an example of a subset of subcarriers that has a consistent modulation type. However, in the systems and methods discussed herein, subsets of subcarriers having a consistent modulation type are not limited to a half-interlace. In general the modulation type does not change within an interlace due to constraints in the FLO protocol. An interlace, as used herein is a set of subcarriers (e.g., 500 subcarriers). Consequently, a half-interlace is one half of an interlace (e.g., 250 subcarriers). However, for rate-⅔ layered modulation, the modulation type can be switched to QPSK within an interlace when operating in base-layer only mode. Even under these conditions the modulation type within each half-interlace remains constant.

Therefore, the modulation type for each half-interlace can be determined using majority voting. To determine the modulation type for a half-interlace or any other subset of subcarriers having a consistent modulation type, the modulation symbol, and consequently the modulation type, can be determined for each subcarrier within the subset. A majority vote based on the modulation type corresponding to each subcarrier can be used to determine the modulation type for the subset. For example, for a half-interlace including 250 subcarriers, the modulation type for 198 of the subcarriers could be consistent with the QPSK modulation type and the modulation symbols for the remaining 52 subcarriers could be consistent with the 16 QAM modulation type. Since the majority of the subcarriers are detected as QPSK, QPSK would be selected as the modulation type for the half-interlace. The 52 subcarriers that were associated with the 16 QAM modulation type can be reevaluated and reassigned to QPSK modulation symbols based upon their location in the constellation diagram. Comparing the subcarrier modulation symbol to the modulation type for the half-interlace and reevaluating subcarrier modulation symbols as needed increases the accuracy of modulation symbol selection.

Figure 12:
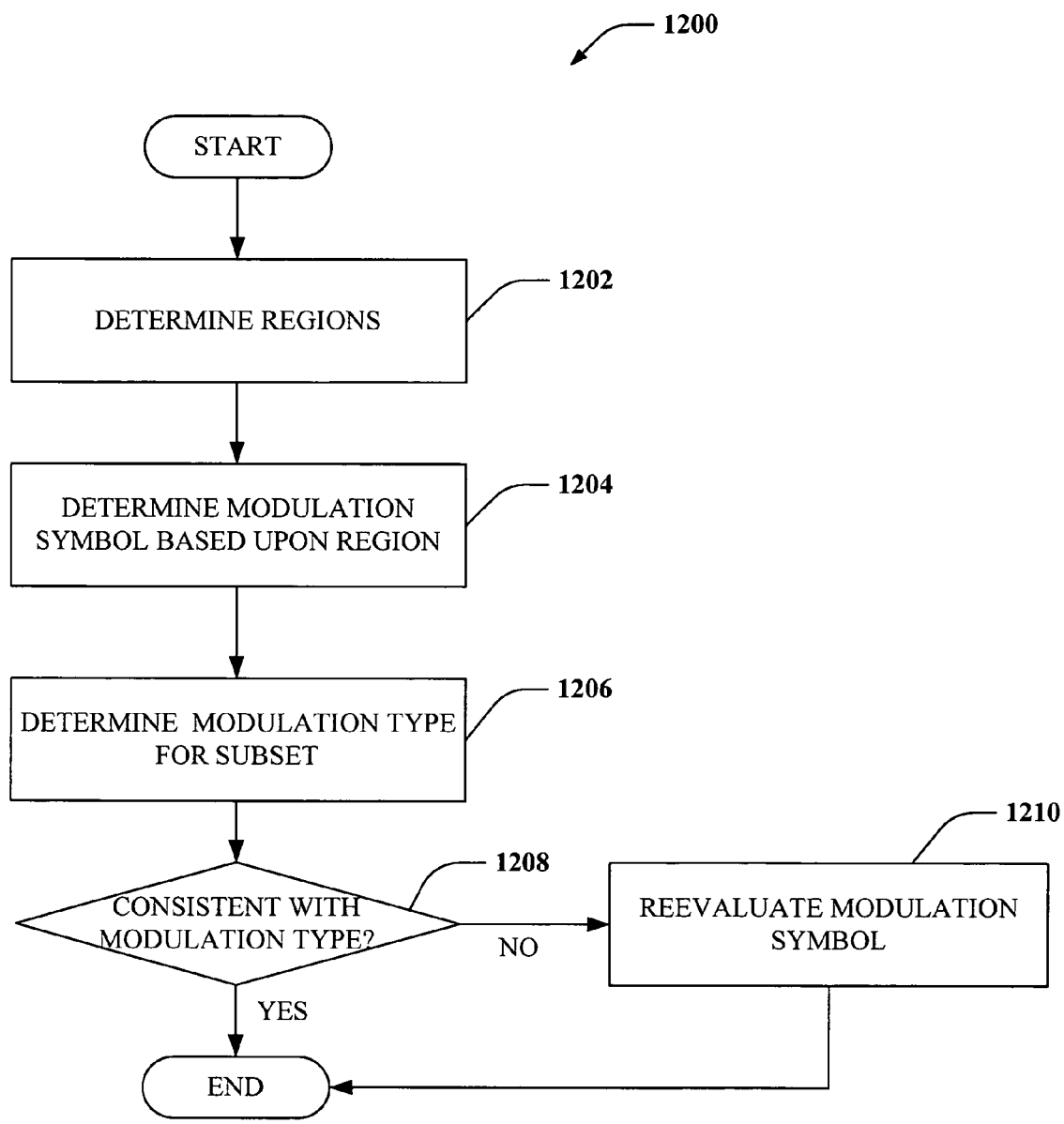
FIG. 12 illustrates a methodology for determining modulation symbols in accordance with one or more aspects presented herein.
Figure 13:
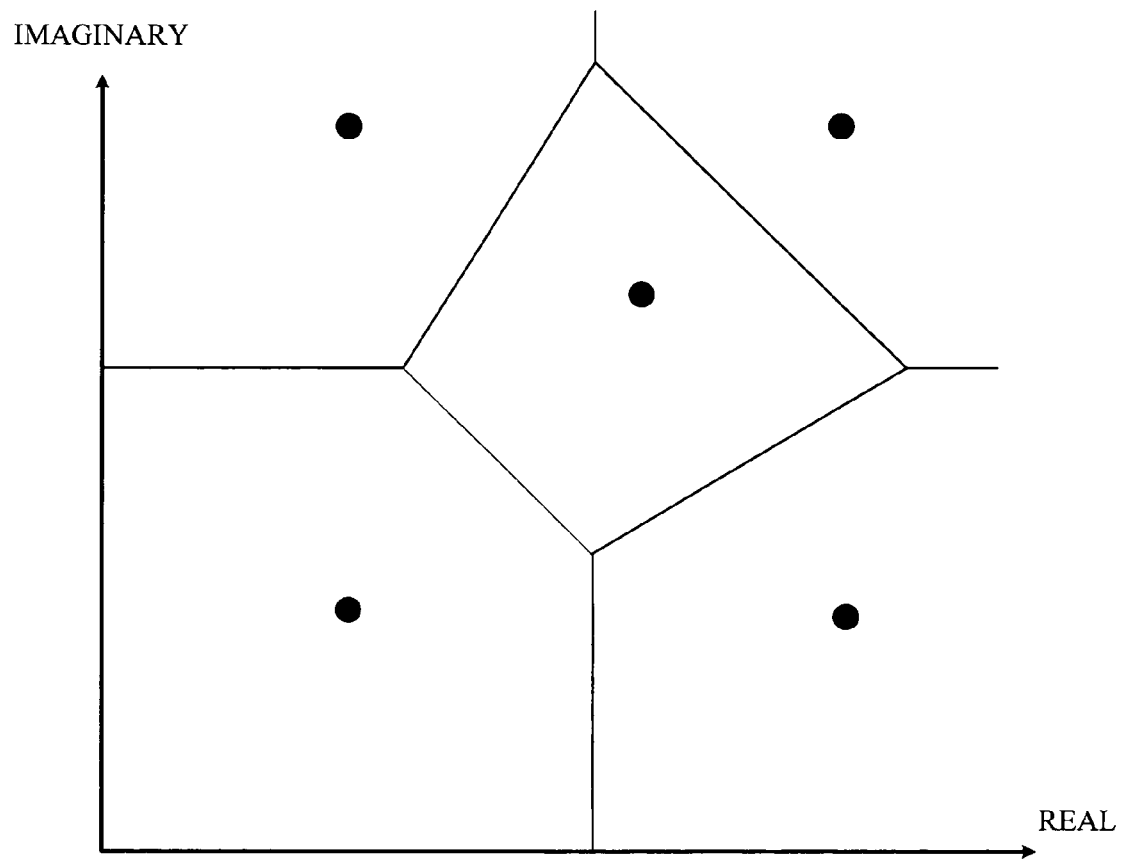
FIG. 13 illustrates the division of a constellation diagram into regions in accordance with one or more aspects presented herein.

Referring now to FIGS. 12-13, a methodology 1200 for determining modulation symbols is illustrated in FIG. 12. At 1202, a constellation diagram including constellation points representing various modulation symbols is divided into a series of regions. Each region is associated with a modulation symbol constellation point. Regions are defined such that every point in each region has the property that the distance of such a point to the constellation point of the region is less than or equal to the distance between such point to the constellation point of any other region. A set of regions covering the first quadrant of the constellation diagram is illustrated in FIG. 13. At 1204, the region in which the received signal constellation point is located is determined. The modulation symbol corresponding to the region in which the received signal constellation point is located is selected as the modulation symbol. The modulation symbol can be checked against the modulation type for a subset of subcarriers having a consistent modulation type (e.g., a half-interlace). The modulation type for the subset of subcarriers can be determined at 1206. At 1208, it is determined whether the modulation symbol is consistent with the modulation type. If yes, the process terminates. If no, the modulation symbol is reevaluated and a modulation symbol consistent with the modulation type is selected at 1210. If the modulation symbol is inconsistent with the modulation type of the subset, the modulation symbol consistent with the modulation type is selected.

Figure 14:
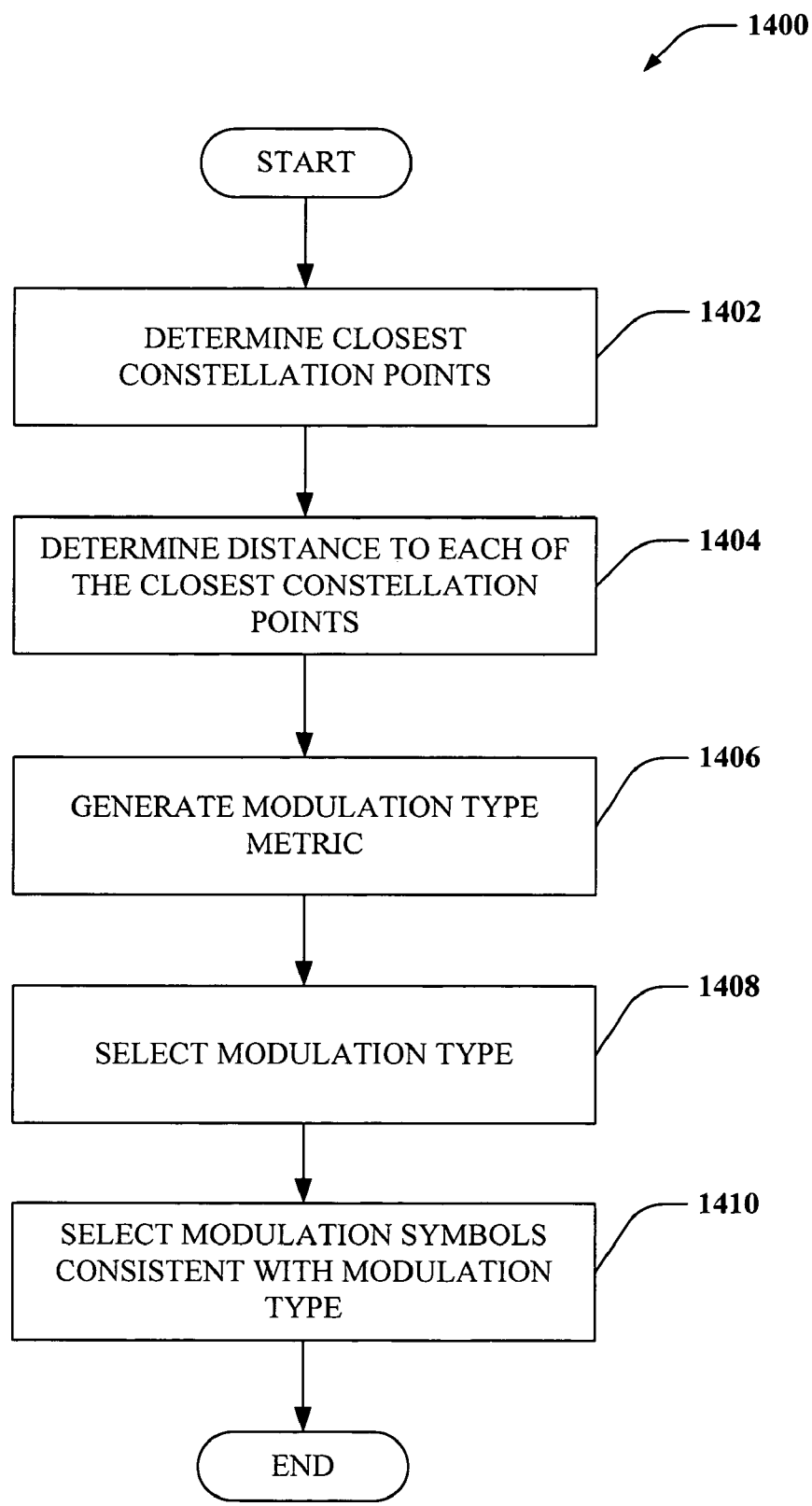
FIG. 14 illustrates a methodology for determining modulation symbols during transmitter evaluation in accordance with one or more aspects presented herein.

Referring now to FIG. 14, a methodology 1400 for determining the modulation type and modulation symbols for a subset of subcarriers having a consistent modulation type (e.g., a half-interlace) is illustrated. At 1402, the modulation symbol constellation point closest to the signal constellation point is determined for each modulation type. The closest modulation symbol constellation point for each modulation type is determined for each subcarrier. For example, if there are three possible modulation types (e.g., 16 QAM, ER4 and ER6.25), three closest modulation symbol constellation points, one for each type, are determined for every subcarrier in the subset of subcarriers.

The closest modulation symbol constellation point for a modulation type can be determined by calculating the distance between the received signal constellation point and possible modulation symbol constellation points and selecting the modulation symbol constellation point corresponding to the minimum distance. Alternatively, the closest modulation symbol constellation points can be determined using regions. The closest modulation symbol constellation point for a particular modulation type can be determined by partitioning the constellation diagram into regions corresponding to the modulation symbols of the modulation type. Regions are defined such that every point in each region has the property that the distance of such a point to the constellation point of the region is less than or equal to the distance between such point to the constellation point of any other region. The modulation symbol corresponding to the region in which the received signal constellation point is located is selected as the closest modulation symbol constellation point for that particular modulation type.

At 1404, if the distance was not calculated above, the distance between the signal constellation point and each of the closest modulation symbol points is determined for each subcarrier in the subset of subcarriers. Whether the distance was calculated previously or at 1404, a distance value for each modulation type will be associated with each subcarrier. For example, if there are three possible modulation types, each subcarrier in the subset will have three distance values associated with it. Each of the distance values corresponds to one of the three possible modulation types. The distance value can be calculated as the minimum distance square between the closest modulation symbol constellation point for a modulation type and the signal constellation point.

At 1406, a metric is generated for each modulation type over the subset. The metric for a modulation type can be generated by summing the distance square values for each subcarrier in the subset for that modulation type. Alternatively, the metric for a modulation type can be generated by averaging the distance values for each subcarrier in the subset for that modulation type. At 1408, the modulation type can be selected based upon the generated metrics. For example, if the metric is generated by summing the distance square values for each subcarrier in the subset for a modulation type, the selected modulation type should correspond to the metric with the smallest value. Once the modulation type for the subset has been selected, modulation symbols corresponding to the closest modulation symbol points for the selected modulation type can be used as the modulation symbol for the subcarrier at 1410.

The transmitter evaluation systems and methods described herein should also include phase correction, intended to reduce or eliminate error or distortions caused by time frequency offsets. If phase correction is not performed, the channel estimate average can be inaccurate and consequently, the evaluation metrics may be incorrect. Typically, phase correction can be performed prior to the averaging of the channel estimates to correct for phase ramp due to frequency offsets.

Figure 15:
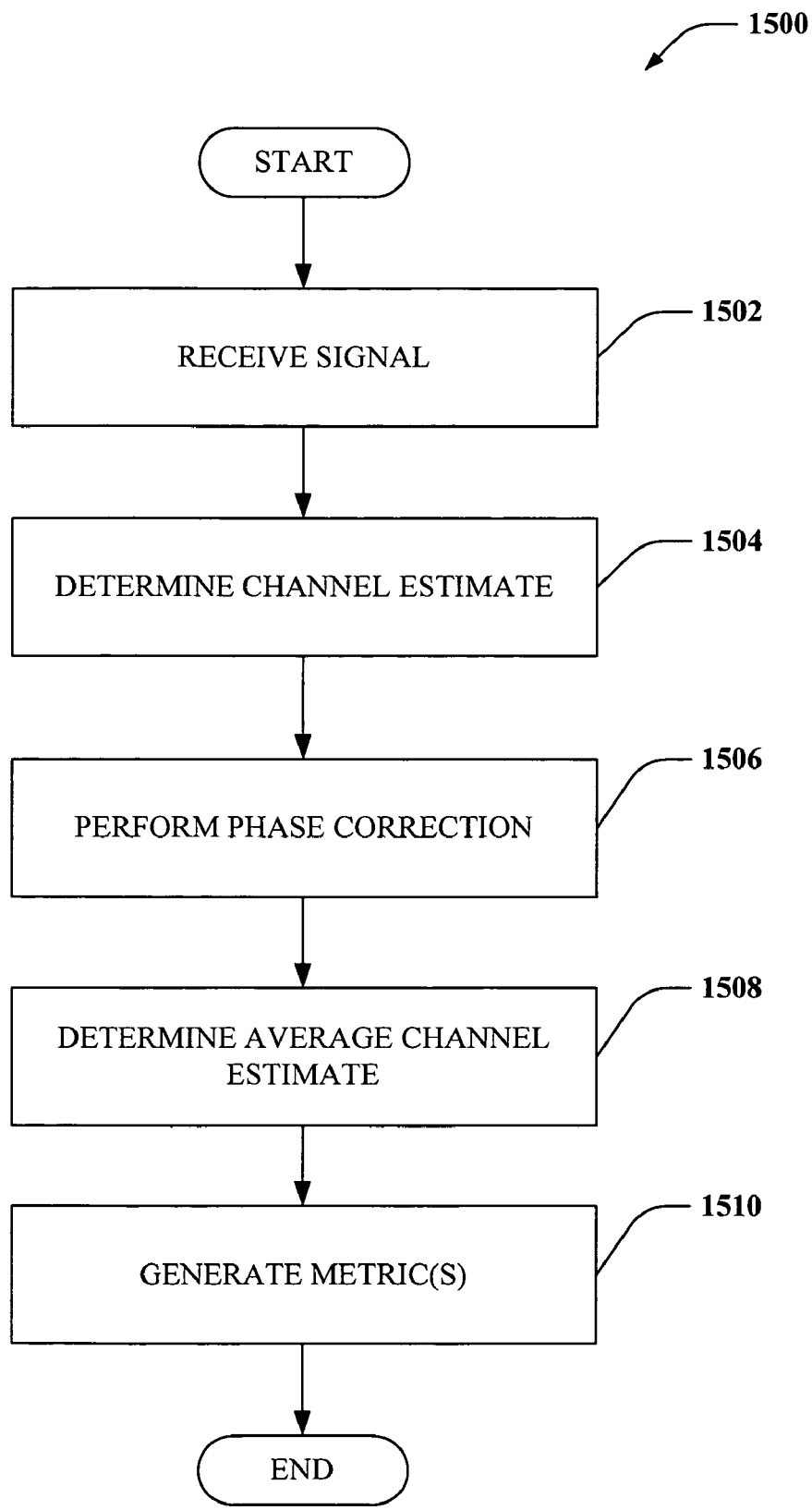
FIG. 15 illustrates a methodology for evaluating a transmitter using phase correction in accordance with one or more aspects presented herein.

Referring now to FIG. 15, a methodology 1500 for evaluating a transmitter using phase correction is illustrated. At 1502, the signal is received from the transmitter. Channel estimates for subcarriers can be determined at 1504. The channel estimates can be determined using known symbols, as illustrated in FIG. 7, or unknown symbols, as illustrated in FIG. 9. At 1506, phase correction can be performed. After phase correction, the average channel estimate can be determined at 1508. One or more metrics for evaluating transmitter performance can be generated at 1510. For example, the MER for the subcarrier can be determined based upon the channel estimate and/or the pilot MERs can be generated for one or more of the pilot symbols.

Figure 16:
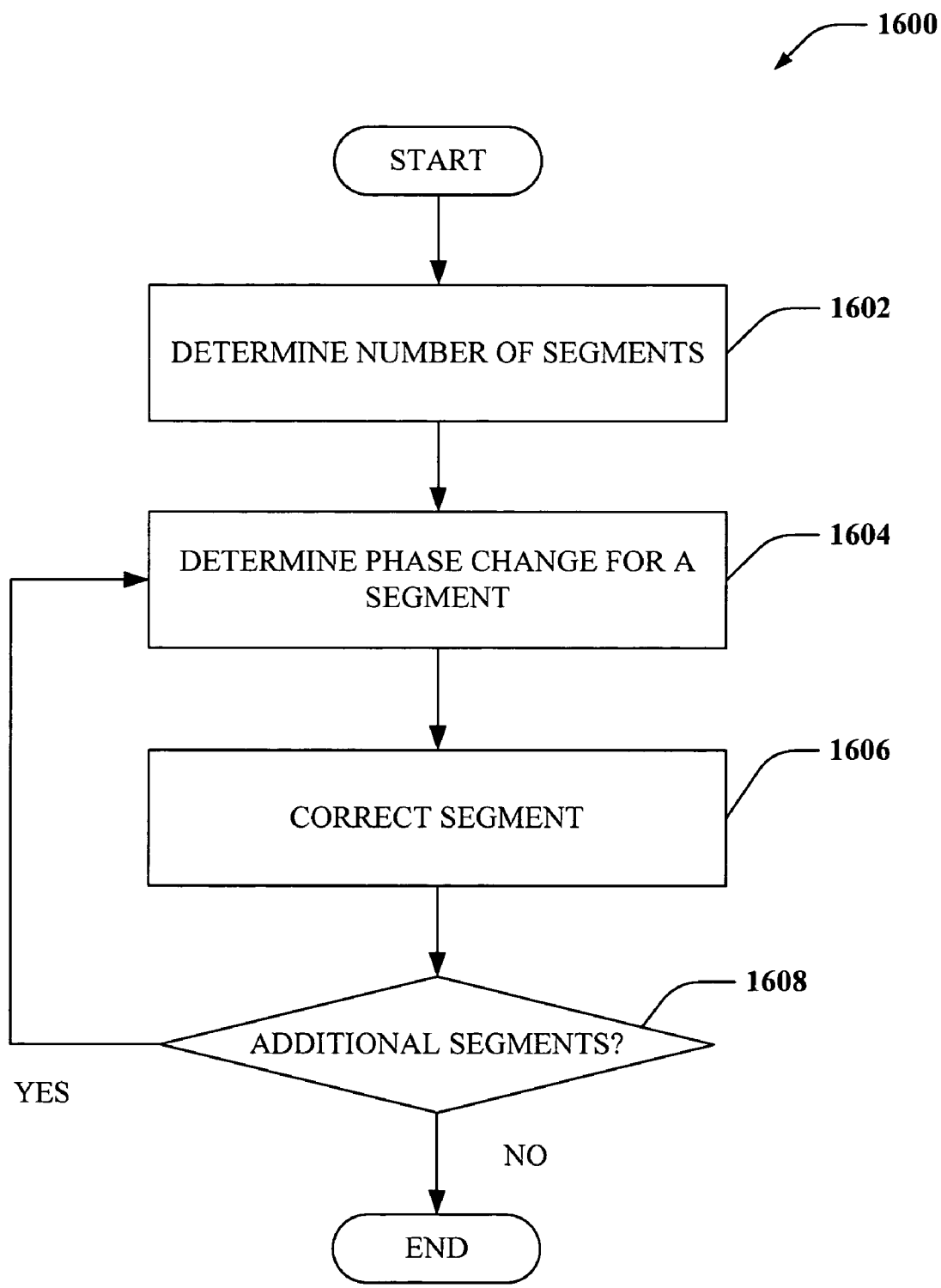
FIG. 16 illustrates a methodology for performing phase correction in accordance with one or more aspect presented herein.

Referring now to FIG. 16, a methodology 1600 for correcting frequency offset is illustrated. The received signal including a frequency offset can be written as follows:

$$r(t) = \sum_{n=0}^{N-1} R_n e^{j(\omega_0 + n\omega_s + \Delta\omega)t}$$

Here $R_n$ is the complex amplitude of the nth subcarrier and N is the total number of subcarriers. The frequency of the initial subcarrier is represented by $\omega_0$, $\omega_s$ represents the subcarrier spacing and $\Delta\omega$ is the frequency offset. A constant frequency offset will result in a linear phase change with time. A frequency offset that varies linearly with time will result in a parabolic phase change over time. Either a constant or linearly changing frequency offset results in a predictable phase change which can be corrected prior to averaging, as shown in FIG. 15.

A linear phase change can be corrected using a first order phase correction algorithm by calculating the slope of phase change. For example, the phase change can be calculated as follows:

$$\frac{d\varphi}{dt} = \frac{1}{T_{OFDM}} \sum_{l=0}^{L} \Delta\varphi_{l+1} = \frac{\varphi_L - \varphi_0}{L}$$

Here, $\Delta\phi_{k+1} = \phi_{k+1} - \phi_k$ is the phase change of the channel estimation between two adjacent OFDM symbols, $\phi_0$ is the phase of the initial channel estimation, L is the number of OFDM symbols and $T_{OFDM}$ is period.

A parabolic phase change can be corrected using a second order phase correction with a LS algorithm to determine the parameters, a, b and c, of the parabolic function. The estimated phase can be written as follows:

$$\phi_{est} = a \cdot t^2 + b \cdot t + c$$

Here, t is time. The estimated phase can be used to correct the estimated channels prior to averaging.

However, the frequency offset is not necessarily constant or linearly varying. Consequently, the phase change is not necessarily linear or parabolic and predictable. One possible solution for correcting for a variable frequency offset includes separating the time duration into segments and then estimating the phase change for each segment. As a result, the estimated noise variance $B_k$ in the $MER_k$ equation described with respect to FIG. 7 should be modified as follows:

$$B_k = \frac{2}{2L - N - 1} \sum_{l=1}^{L} W_{w,l}^2$$

Here, N is the number of segments.

The noise term for each channel of each OFDM symbol derived from the received signal can be decomposed into two orthogonal dimensions: amplitude dimension and phase dimension. The noise term in the amplitude dimension can be considered additive white Gaussian noise. The noise term in the phase direction can be considered the sum of the additive white Gaussian noise (AWGN) and the distortion that comes from the frequency offset. The distortion caused by the frequency offset should be eliminated. However, the component of AWGN in the phase dimension should be maintained.

As shown in the methodology 1600 illustrated in FIG. 16, at 1602 the number of segments into which the time will be divided is determined. At 1604 the phase change due to frequency offset is estimated for a segment. The segment is corrected using either a first or second order correction algorithm at 1606. At 1608 a determination is made as to whether there are additional segments to correct. If yes, the process returns to 1604 to determine the phase correction for the next segment. If no, the process terminates.

In one extreme case, if the variance of the noise in the amplitude dimension is equal to that of the variance of the noise in the phase dimension, the maximum number of segments is equal to the number of OFDM symbols being processed. Consequently, the noise in the phase dimension will be eliminated as well as the distortion due to frequency offset. As a result, the true value of MER, which includes the noise in the phase dimension, will be equal to the value of the generated MER minus a constant (e.g., 3.01 dB).

It will be appreciated that, in accordance with one or more embodiments described herein, inferences can be made regarding transmission formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding the number of segments to utilize for phase correction. Inferences can also be made regarding the type and number of metrics to generate to evaluate the transmitter. In addition, inferences can be made regarding the data and format to display to a user.

Figure 17:
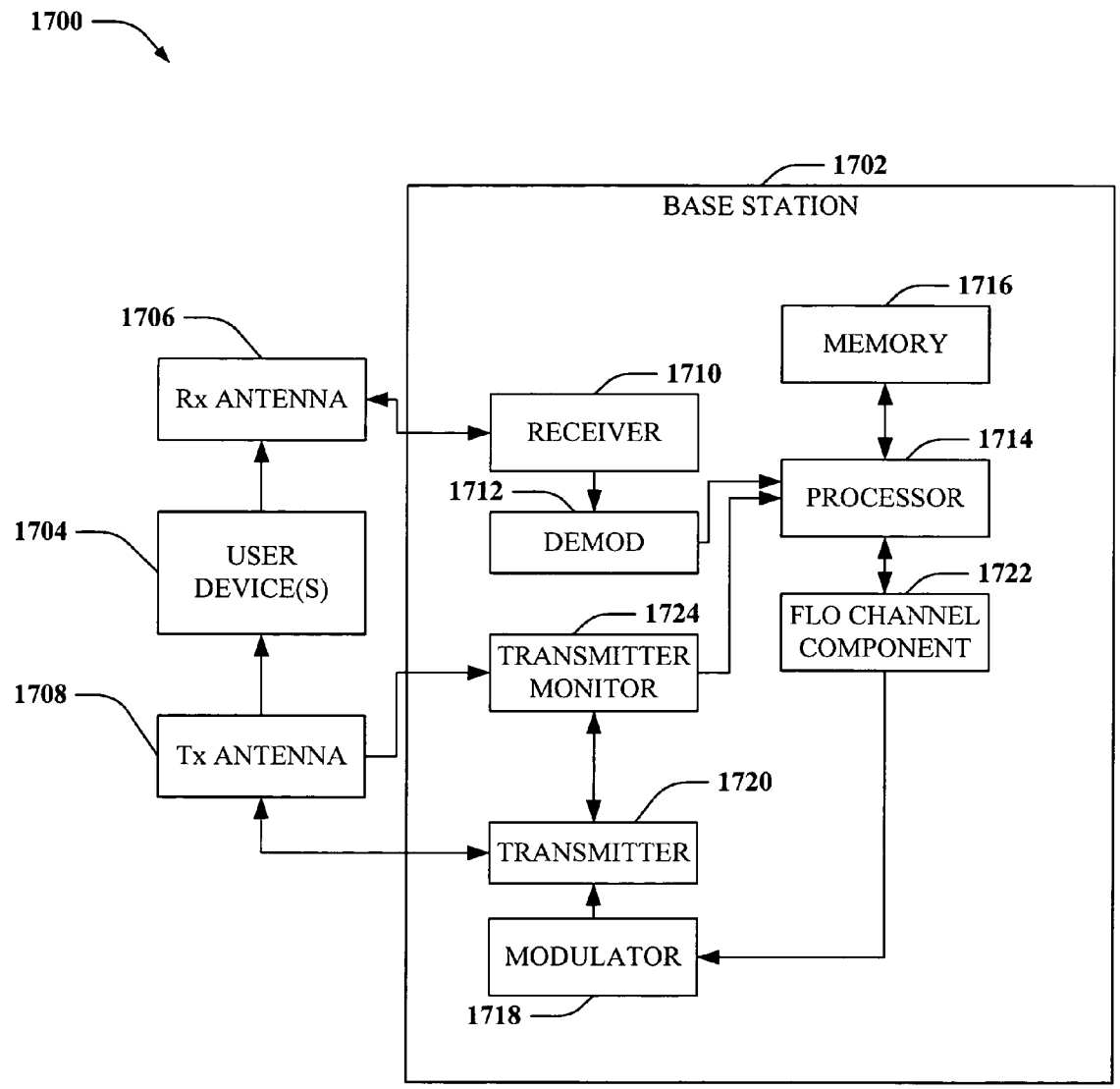
FIG. 17 is an illustration of a system that monitors transmitter performance in a wireless communication environment in accordance with various aspects presented herein.

FIG. 17 is an illustration of a system 1700 that provides for monitoring transmitter performance in a communication environment. System 1700 comprises a base station 1702 with a receiver 1710 that receives signal(s) from one or more user devices 1704 via one or more receive antennas 1706, and transmits to the one or more user devices 1704 through one or more transmit antennas 1708. In one or more embodiments, receive antennas 1706 and transmit antennas 1708 can be implemented using a single set of antennas. Receiver 1710 can receive information from receive antennas 1706 and is operatively associated with a demodulator 1712 that demodulates received information. Receiver 1710 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1714. Processor 1714 can be a processor dedicated to analyzing information received by receiver component 1714 and/or generating information for transmission by a transmitter 1714. Processor 1714 can be a processor that controls one or more components of base station 1702, and/or a processor that analyzes information received by receiver 1710, generates information for transmission by a transmitter 1720, and controls one or more components of base station 1702. Receiver output for each antenna can be jointly processed by receiver 1710 and/or processor 1714. A modulator 1718 can multiplex the signal for transmission by a transmitter 1720 through transmit antennas 1708 to user devices 1704. Processor 1714 can be coupled to a FLO channel component 1722 that can facilitate processing FLO information associated with one or more respective user devices 1704.

Modulator 1718 can multiplex a signal for transmission by transmitter 1720 through transmit antenna 1708 to user devices 1704. FLO channel component 1722 can append information to a signal related to an updated data stream for a given transmission stream for communication with user device 1704, which can be transmitted to user device 1704 to provide an indication that a new optimum channel has been identified and acknowledged.

Base station 1702 can also include a transmitter monitor 1724. Transmitter monitor 1724 can sample transmitter output and/or transmitter antenna output and evaluate the performance of transmitter 1720. Transmitter monitor 1724 can be coupled to processor 1714. Alternatively, transmitter monitor 1724 can include a separate processor for processing transmitter output. In addition, transmitter monitor 1724 may be independent of base station 1702.

Base station 1702 can additionally comprise memory 1716 that is operatively coupled to processor 1714 and that can store information related to constellation regions, modulation symbols and/or any other suitable information related to performing the various actions and functions set forth herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1716 of the subject systems and methods is intended to comprise, without being limited to, these and any other suitable types of memory.

Figure 18:
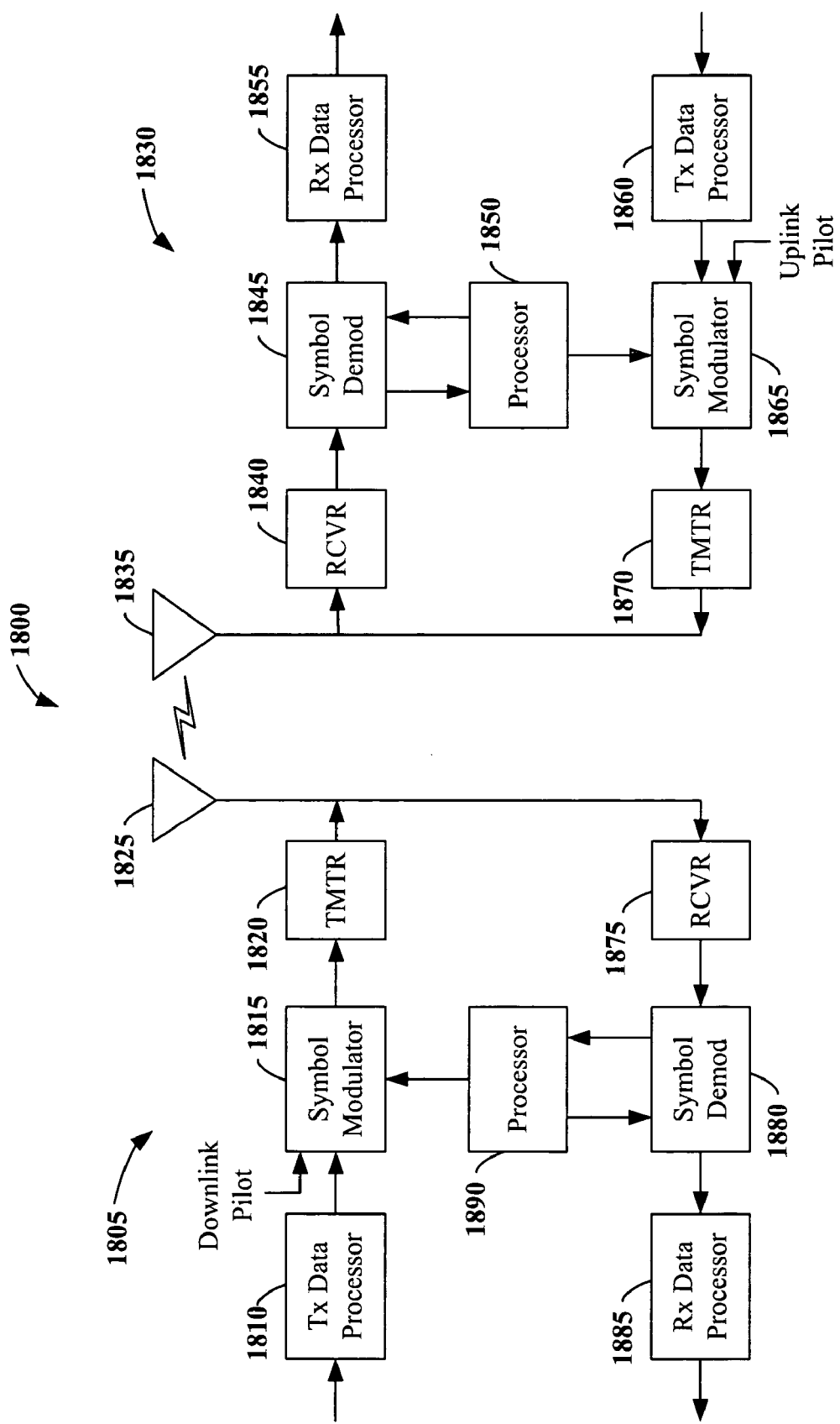
FIG. 18 is an illustration of a wireless communication environment that can be employed in conjunction with the various systems and methods described herein.

FIG. 18 shows an exemplary wireless communication system 1800. The wireless communication system 1800 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems (FIGS. 1, 3-4 and 18) and/or methods (FIGS. 7-12 and 14-16) described herein.

Referring now to FIG. 18, on a downlink, at access point 1805, a transmit (TX) data processor 1810 receives, formats, codes, interleaves, and modulates (or symbol maps) traffic data and provides modulation symbols ("data symbols"). A symbol modulator 1815 receives and processes the data symbols and pilot symbols and provides a stream of symbols. Symbol modulator 1815 multiplexes data and pilot symbols and provides them to a transmitter unit (TMTR) 1820. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1825 to the user devices. At user device 1830, an antenna 1835 receives the downlink signal and provides a received signal to a receiver unit (RCVR) 1840. Receiver unit 1840 conditions (e.g., filters, amplifies, and frequency downconverts) the received signal and digitizes the conditioned signal to obtain samples. A symbol demodulator 1845 demodulates and provides received pilot symbols to a processor 1850 for channel estimation. Symbol demodulator 1845 further receives a frequency response estimate for the downlink from processor 1850, performs data demodulation on the received data symbols to obtain data symbol estimates (which are estimates of the transmitted data symbols), and provides the data symbol estimates to an RX data processor 1855, which demodulates (i.e., symbol demaps), deinterleaves, and decodes the data symbol estimates to recover the transmitted traffic data. The processing by symbol demodulator 1845 and RX data processor 1855 is complementary to the processing by symbol modulator 1815 and TX data processor 1810, respectively, at access point 1805.

On the uplink, a TX data processor 1860 processes traffic data and provides data symbols. A symbol modulator 1865 receives and multiplexes the data symbols with pilot symbols, performs modulation, and provides a stream of symbols. A transmitter unit 1870 then receives and processes the stream of symbols to generate an uplink signal, which is transmitted by the antenna 1835 to the access point 1805.

At access point 1805, the uplink signal from user device 1830 is received by the antenna 1825 and processed by a receiver unit 1875 to obtain samples. A symbol demodulator 1880 then processes the samples and provides received pilot symbols and data symbol estimates for the uplink. An RX data processor 1885 processes the data symbol estimates to recover the traffic data transmitted by user device 1830. A processor 1890 performs channel estimation for each active user device transmitting on the uplink. Multiple user devices may transmit pilot concurrently on the uplink on their respective assigned sets of pilot subcarriers, where the pilot subcarrier sets may be interlaced.

Processors 1890 and 1850 direct (e.g., control, coordinate, manage, etc.) operation at access point 1805 and user device 1830, respectively. Respective processors 1890 and 1850 can be associated with memory units (not shown) that store program codes and data. Processors 1890 and 1850 can utilize any of the methodologies described herein. Respective Processors 1890 and 1850 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 19:
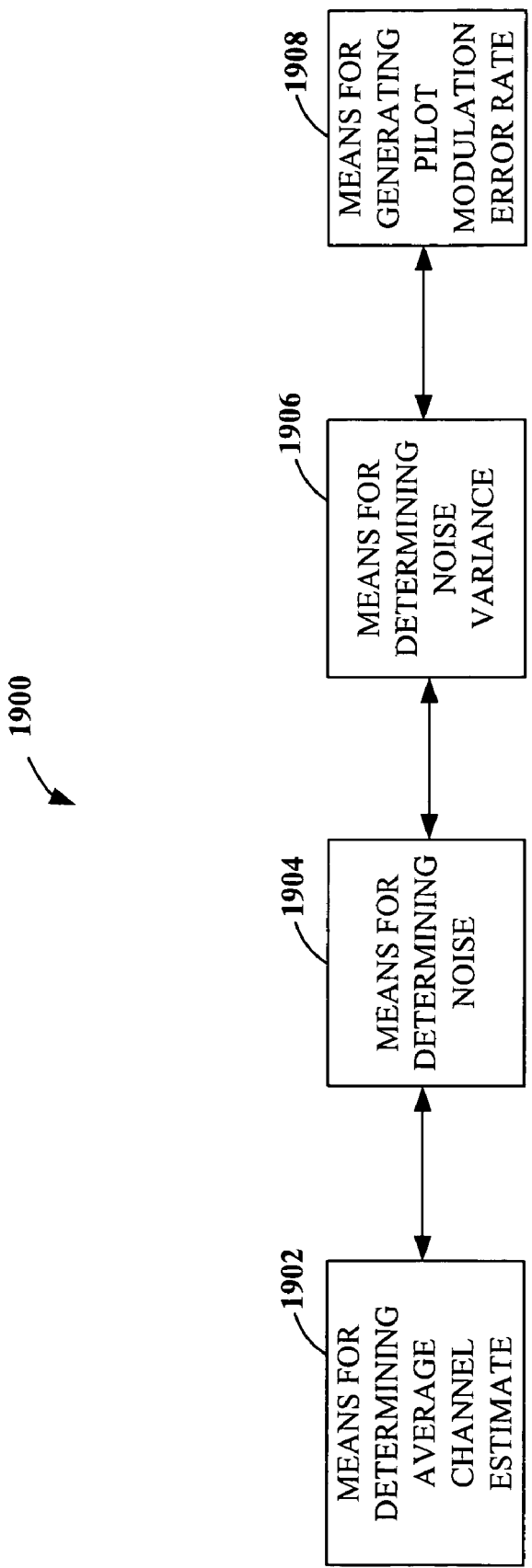
FIG. 19 is an illustration of a system that evaluates transmitter performance in a wireless communication environment in accordance with various aspects presented herein.

Referring now to FIG. 19, a system 1900 for facilitating evaluation of transmitter performance in a wireless communication environment in accordance with one or more aspects presented herein is illustrated. System 1900 can include means for generating an average frequency domain channel estimate 1902 for each of a plurality of subcarriers for a superframe of the transmitter signal. System 1900 can also include means for determining pilot symbol noise or error 1904 for the subcarriers associated with the pilot symbol based upon the average frequency domain channel estimates. In addition, system 1900 can include means for determining average noise variance 1906 for each of the pilot symbols based at least in part upon the pilot symbol noise for each of the set of subcarriers associated with the pilot symbol. The system 1900 also includes means for generating a pilot modulation error ratio based at least in part upon the average noise variance for the pilot symbols and the average frequency domain channel estimates.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of for facilitating evaluation of transmitter performance for a wireless communication environment, comprising:
   generating an average frequency domain channel estimate for each of a plurality of subcarriers for a unit of data of a transmitter signal;
   determining pilot symbol noise for each of the plurality of subcarriers associated with a pilot symbol based upon the average frequency domain channel estimate for each of the plurality of subcarriers;
   determining average noise variance for the pilot symbol based at least in part upon the pilot symbol noise for each of the plurality of subcarriers associated with the pilot symbol; and
   generating a pilot modulation error ratio indicative of transmitter performance based at least in part upon the average noise variance for the pilot symbol and the average frequency domain channel estimate for each of the plurality of subcarriers.

2. The method of claim 1, wherein the pilot modulation error ratio is generated for at least one of a time division multiplexed 1 (TDM1) pilot symbol, a wide area identification channel (WIC) pilot symbol, a local area identification channel (LIC) pilot symbol and a time division multiplexed 2 (TDM2) pilot symbol.

3. The method of claim 1, further comprising:
   scaling the average noise variance of the pilot symbol such that the pilot modulation error ratio is comparable to modulation error ratios for data symbols.

4. The method of claim 1, further comprising:
   sampling analog signal from a transmitter to generate the transmitter signal; and correcting the transmitter signal for power amplification nonlinearity caused by sampling an analog signal of the transmitter after power amplification.

5. The method of claim 1, farther comprising:
determining a modulation symbol for each of the plurality of subcarriers, the modulation symbol is utilized in generating the average frequency domain channel estimates.

6. The method of claim 5, determining a modulation symbol for each of the plurality of subcarriers farther comprising:
determining a distance between a point in a complex plane corresponding to the transmitter signal for one of the plurality of subcarriers and a point in the complex plane corresponding to a possible modulation symbol for at least one possible modulation symbol; and
selecting the possible modulation symbol corresponding to the modulation symbol point closest to the signal point, the modulation symbol for the one of the plurality of subcarriers is the selected modulation symbol.

7. The method of claim 1, further comprising:
performing phase correction on frequency domain channel estimates prior to generating the average frequency domain channel estimate.

8. The method of claim 1, the transmitter signal is a forward link only (FLO) signal.

9. An apparatus that facilitates evaluating transmitter performance in a wireless communication environment comprising:
a processor that generates an average frequency domain channel estimates for each of a plurality of subcarriers over a superframe of an RF signal, determines the noise for each subcarrier associated with a pilot symbol, determines the noise variance for the pilot symbol based at least in part upon the average frequency domain channel estimates and generates a pilot modulation error ratio for the pilot symbol based at least in part upon the noise variance for the pilot symbol; and
a memory, coupled to the processor, that stores information related to the pilot symbol.

10. The apparatus of claim 9, further comprising:
a signal analyzer coupled to a transmitter to sample the RF signal.

11. The apparatus of claim 9, wherein the processor determines a modulation symbol for each of the plurality of subcarriers, the modulation symbol is utilized in generating the average frequency domain channel estimate.

12. The apparatus of claim 11, wherein the memory stores a plurality of regions of a constellation diagram, each region corresponding to a possible modulation symbol and the processor selects a region in which a constellation point corresponding to the RF signal is located for each of the plurality of subcarriers, the modulation symbol for the one of the plurality of subcarriers is the possible modulation symbol corresponding to the selected region.

13. The apparatus of claim 9, wherein the processor generates the pilot modulation error ratio for at least one of a time division multiplexed 1 (TDM1) pilot symbol, a wide area identification channel (WIC) pilot symbol, a local area identification channel (LIC) pilot symbol and a time division multiplexed 2 (TDM2) pilot symbol.

14. The apparatus of claim 9, wherein the processor scales the average noise variance of the pilot symbol such that the pilot modulation error ratio is comparable to modulation error ratios for data symbols.

15. The apparatus of claim 9, wherein the processor performs phase correction on the frequency domain channel estimates prior to generating the average frequency domain channel estimates.

16. The apparatus of claim 9, further comprising a display component that provides a user with a graphic user interface (GUI) to view the pilot modulation error ratio for the pilot symbol.

17. A wireless communication apparatus, comprising:
means for generating an average frequency domain channel estimate for each of a plurality of subcarriers over a unit of data of a transmitter signal;
means for determining pilot symbol noise for each of the plurality of subcarriers associated with a pilot symbol based upon the average frequency domain channel estimate for each of the plurality of subcarriers;
means for determining average noise variance for the pilot symbol based at least in part upon the pilot symbol noise for each of the plurality of subcarriers associated with the pilot symbol; and
means for generating a pilot modulation error ratio indicative of transmitter performance based at least in part upon the average noise variance for the pilot symbol and the average frequency domain channel estimate for each of the plurality of subcarriers.

18. The apparatus of claim 17, further comprising:
means for scaling the average noise variance of the pilot symbol such that the pilot modulation error ratio is comparable to modulation error ratios for data symbols.

19. The apparatus of claim 17, further comprising:
means for determining a modulation symbol for each of the plurality of subcarriers, the modulation symbol is utilized in generating the average frequency domain channel estimates.

20. The apparatus of claim 19, further comprising:
means for determining a distance between a point in a complex plane corresponding to the transmitter signal for one of the plurality of subcarriers and a point in the complex plane corresponding to a possible modulation symbol for at least one possible modulation symbol; and
means for selecting the possible modulation symbol corresponding to the modulation symbol point closest to the signal point, the modulation symbol for the one of the plurality of subcarriers is the selected modulation symbol.

21. The apparatus of claim 17, further comprising:
means for performing phase correction on frequency domain channel estimates prior to generating the average frequency domain channel estimate.

22. The apparatus of claim 17, wherein the pilot symbol is at least one of a time division multiplexed 1 (TDM1) pilot symbol, a wide area identification channel (WIC) pilot symbol, a local area identification channel (LIC) pilot symbol and a time division multiplexed 2 (TDM2) pilot symbol.

23. A computer-readable medium encoded with a computer program comprising instructions for:
generating an average frequency domain channel estimate for each of a plurality of subcarriers over a unit of data of a transmitter signal;
determining pilot symbol noise for each of the plurality of subcarriers associated with a pilot symbol based upon the average frequency domain channel estimate for each of the plurality of subcarriers;
determining average noise variance for the pilot symbol based at least in part upon the pilot symbol noise for each of the plurality of subcarriers associated with the pilot symbol; and generating a pilot modulation error ratio indicative of transmitter performance based at least in part upon the average noise variance for the pilot symbol and the average frequency domain channel estimate for each of the plurality of subcarriers.

24. The computer-readable medium of claim 23, the program further comprising instructions for: scaling the average noise variance of the pilot symbol such that the pilot modulation error ratio is comparable to modulation error ratios for data symbols.

25. The computer-readable medium of claim 23, the program further comprising instructions for: performing phase correction on frequency domain channel estimates prior to generating the average frequency domain channel estimate.

26. The computer-readable medium of claim 23, the program further comprising
instructions for: determining a modulation symbol for each of the plurality of subcarriers, the modulation symbol is utilized in generating the average frequency domain channel estimates.

27. The computer-readable medium of claim 26, the instructions of determining the modulation symbol further comprising:
determining a distance between a point in a complex plane corresponding to the transmitter signal for one of the plurality of subcarriers and a point in the complex plane corresponding to a possible modulation symbol for at least one possible modulation symbol; and
selecting the possible modulation symbol corresponding to the modulation symbol point closest to the signal point, the modulation symbol for the one of the plurality of subcarriers is the selected modulation symbol.

28. The computer-readable medium of claim 23, the instructions of determining the modulation symbol further comprising:
generating a graphic user interface (GUI) for presenting a user with the pilot modulation error ratio.

29. A processor that executes instructions for evaluating transmitter performance in a wireless communication environment, the instructions comprising:
generating an average frequency domain channel estimate for each of a plurality of subcarriers over a unit of data of a transmitter signal;
determining pilot symbol noise for each of the plurality of subcarriers associated with a pilot symbol based upon the average frequency domain channel estimate for each of the plurality of subcarriers;
determining average noise variance for the pilot symbol based at least in part upon the pilot symbol noise for each of the plurality of subcarriers associated with the pilot symbol; and
generating a pilot modulation error ratio indicative of transmitter performance based at least in part upon the average noise variance for the pilot symbol and the average frequency domain channel estimate for each of the plurality of subcarriers.

30. The processor of claim 29, the instructions further comprising:
scaling the average noise variance of the pilot symbol such that the pilot modulation error ratio is comparable to modulation error ratios for data symbols.

31. The processor of claim 29, the instructions further comprising: determining a
modulation type for each of the plurality of subcarriers, the modulation symbol is utilized in generating the average frequency domain channel estimates.

32. The processor of claim 31, the instructions further comprising:
determining a modulation type based on majority vote for a subset of the plurality of subcarriers that has a consistent modulation type; and
reevaluating the modulation type for each subcarrier in the subset of the plurality of subcarriers where the modulation symbol of the subcarrier is inconsistent with the modulation type.

33. The processor of claim 29, wherein the pilot modulation error ratio is generated for at least one of a time division multiplexed 1 (TDM1) pilot symbol, a wide area identification channel (WIC) pilot symbol, a local area identification channel (LIC) pilot symbol and a time division multiplexed 2 (TDM2) pilot symbol.

34. The processor of claim 29, the instructions further comprising:
performing phase correction on frequency domain channel estimates prior to generating the average frequency domain channel estimate.

* * * * *